US008055895B2

(12) United States Patent
Buer et al.

(10) Patent No.: US 8,055,895 B2
(45) Date of Patent: *Nov. 8, 2011

(54) DATA PATH SECURITY PROCESSING

(75) Inventors: Mark Buer, Gilbert, AZ (US); Scott S. McDaniel, Villa Park, CA (US); Uri Elzur, Irvine, CA (US); Joseph J. Tardo, Palo Alto, CA (US); Kan Fan, Diamond Bar, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/551,381

(22) Filed: Aug. 31, 2009

(65) Prior Publication Data
US 2009/0319775 A1    Dec. 24, 2009

Related U.S. Application Data

(63) Continuation of application No. 10/727,430, filed on Dec. 4, 2003, now Pat. No. 7,587,587.

(60) Provisional application No. 60/431,087, filed on Dec. 5, 2002.

(51) Int. Cl.
H04L 29/08 (2006.01)
H04L 9/00 (2006.01)

(52) U.S. Cl. .............................. 713/153; 713/151; 726/26

(58) Field of Classification Search .................. 713/151, 713/153; 726/26
See application file for complete search history.

(56) References Cited

U.S. PATENT DOCUMENTS

| 6,157,955 | A  | * | 12/2000 | Narad et al. ................. 709/228 |
| 6,327,176 | B1 | * | 12/2001 | Li et al. ......................... 365/156 |
| 6,327,625 | B1 |   | 12/2001 | Wang et al. |
| 6,438,612 | B1 |   | 8/2002  | Ylonen et al. |
| 6,732,176 | B1 |   | 5/2004  | Stewart et al. |
| 6,839,346 | B1 |   | 1/2005  | Kametani |
| 6,939,346 | B2 | * | 9/2005  | Kannenberg et al. ........... 606/34 |
| 6,947,430 | B2 | * | 9/2005  | Bilic et al. ................ 370/395.71 |
| 6,959,007 | B1 | * | 10/2005 | Vogel et al. ................... 370/469 |
| 6,963,946 | B1 |   | 11/2005 | Dwork et al. |

(Continued)

FOREIGN PATENT DOCUMENTS
EP    1 328 104 A    7/2003
(Continued)

OTHER PUBLICATIONS

Anonymous. "*HIFN 8300/8350 HIPP III Security Processors.*" Internet Article. Retrieved from the Internet on Oct. 27, 2005 from URL: http//web.archive.org/web/20021101104154/http://www.hifn.com/products/8330-8350.html Nov. 1, 2002, pp. 1-4.

(Continued)

Primary Examiner — Kambiz Zand
Assistant Examiner — William Powers
(74) Attorney, Agent, or Firm — Sterne, Kessler, Goldstein & Fox P.L.L.C.

(57) ABSTRACT

Methods and associated systems provide secured data transmission over a data network. A security device provides security processing in the data path of a packet network. The device may include at least one network interface to send packets to and receive packets from a data network and at least one cryptographic engine for performing encryption, decryption and/or authentication operations. The device may be configured as an in-line security processor that processes packets that pass through the device as the packets are routed to/from the data network.

19 Claims, 23 Drawing Sheets

U.S. PATENT DOCUMENTS

| | | | |
|---|---|---|---|
| 7,003,118 | B1 | 2/2006 | Yang et al. |
| 7,062,566 | B2 * | 6/2006 | Amara et al. ............ 709/229 |
| 7,093,280 | B2 | 8/2006 | Ke et al. |
| 7,131,141 | B1 | 10/2006 | Blewett et al. |
| 7,155,518 | B2 | 12/2006 | Forslow |
| 7,162,630 | B2 * | 1/2007 | Sperry et al. ............ 713/153 |
| 7,194,766 | B2 | 3/2007 | Noehring et al. |
| 7,305,492 | B2 | 12/2007 | Bryers et al. |
| 7,346,701 | B2 | 3/2008 | Elzur et al. |
| 7,363,353 | B2 | 4/2008 | Ganesan et al. |
| 7,478,427 | B2 | 1/2009 | Mukherjee et al. |
| 7,480,284 | B2 | 1/2009 | Wengrovitz et al. |
| 7,535,913 | B2 | 5/2009 | Minami et al. |
| 2002/0162026 | A1 * | 10/2002 | Neuman et al. ............ 713/201 |
| 2004/0044798 | A1 | 3/2004 | Elzur et al. |
| 2004/0090972 | A1 | 5/2004 | Barrett et al. |
| 2004/0093411 | A1 | 5/2004 | Elzur et al. |
| 2004/0139313 | A1 | 7/2004 | Buer et al. |
| 2004/0143734 | A1 | 7/2004 | Buer et al. |

FOREIGN PATENT DOCUMENTS

| | | |
|---|---|---|
| EP | 1 427 133 | 6/2004 |
| EP | 1 427 164 | 6/2004 |
| WO | WO 01/05086 A2 | 1/2001 |

OTHER PUBLICATIONS

Cassidy, Kyle, "An Ethernet Primer", 2001 Que Publishing, p. 1-8.

European Search Report for Application No. 03028115.8-2413 issued on Nov. 28, 2007, 3 pages.

Kent et al., "Security Architecture for the Internet Protocol", RFC 2401, Network Working Group, 1998.

Krishna et al., "Distributed Processing in a Cryptography Acceleration Chip", U.S. Appl. No. 09/610,798, filed Jul. 6, 2000.

Partial European Search Report for Application No. EP03028116; date of completion Nov. 2, 2005, The Hague (2 pages); Lack of Unity of Invention, Sheet B (1 page); Annex to the European Search Report on European Patent Application No. EP03028116 (1 page).

Pidgeon, Nick, "How Ethernet Works", Apr. 2003, www.howstuffworks.com, accessed via web.archive.org on Jun. 24, 2007, pp. 1,2.

Stevens, Richard. TCP/IP Illustrated, vol. 1, 1994, Addison Wesley, p. 21-23.

* cited by examiner

DATA PATH SECURITY PROCESSING

CROSS-REFERENCE TO RELATED APPLICATIONS

This application is a Continuation of U.S. patent application Ser. No. 10/727,430, filed on Dec. 4, 2003, which claims the benefit of U.S. Provisional Patent Application No. 60/431,087, the disclosures of which are hereby incorporated by reference herein.

This application is related to U.S. patent application Ser. No. 10/728,192 entitled TAGGING MECHANISM FOR DATA PATH SECURITY PROCESSING, filed on Dec. 4, 2003 and assigned to the same assignee as this application, the disclosure of which is hereby incorporated by reference herein.

FIELD OF THE INVENTION

The invention relates generally to the field of data communications and, more particularly, to systems and methods for providing secured data transmission over data networks.

BACKGROUND

The transmission of data over a data network typically involves sending messages between application programs ("applications") executing on host processors connected to the data network. In a packet network such as the Internet a host processor encapsulates data from an application into data packets (e.g., frames) to send the data over the packet network. When a host processor receives the data packet from the packet network, the host processor unencapsulates the packets to obtain the data. The host processor then provides the data to the appropriate application.

The process of encapsulating data into a packet involves adding information such as source and destination addresses to the data to facilitate transmission of the data over the packet network. Conventionally, the encapsulation process follows a particular packet data protocol. A typical protocol defines the structure of a packet such as the location of the source address and the destination address in the packet. A protocol also may define procedures for routing the packet over the network using those addresses. For example, the components in a data network may use the destination address to determine where to send the packet. The recipient application may use the source address to determine which application sent the packet.

Common protocols used in conjunction with the Internet include Internet protocol ("IP"), transmission control protocol ("TCP"), user datagram protocol ("UDP") and Internet control message protocol ("ICMP"). In general, IP relates to controlling data transfer between host processors, TCP relates to establishing sessions to transfer data between applications, UDP provides a faster but less reliable data transfer mechanism than TCP, and ICMP relates to error messages and network traffic statistics.

Data transmitted over public networks such as the Internet may be encrypted to prevent unauthorized parties from intercepting the data. Typically, a device connected to the network encrypts data using a cipher algorithm and an encryption key. The device sends the encrypted data over the network to another device that decrypts the data using the cipher algorithm and a decryption key.

Several standards have been developed to facilitate secure data transmission over data networks. For example, the Internet security protocol ("IPsec") may be used to establish secure host-to-host pipes and virtual private networks over the Internet. IPsec defines a set of specifications for cryptographic encryption and authentication. IPsec also supports several algorithms for key exchange, including an Internet Key Exchange ("IKE") algorithm for establishing keys for secure sessions established between applications.

Some systems include dedicated devices that offload some of the processing operations from the host processor. For example, a network processor may be used to perform some of the packet processing operations. A cryptographic accelerator may be used to perform the cipher algorithms to offload encryption/decryption/authentication processing from the host processor.

In a typical system, the primary data flow is from the host processor to the network processor then to the network, and vice-versa. In addition, the host processor or network processor routes packets that will be encrypted or decrypted to the cryptographic accelerator. The cryptographic accelerator then routes the encrypted or decrypted packets back to the host processor or network processor. In personal computer-based systems, the host processor, network processor and cryptographic accelerator typically are connected via a peripheral component interface ("PCI") bus.

Conventional PCI-resident cryptographic engines (e.g., cryptographic accelerators or processors) have several disadvantages. For example, the data may be subject to additional round trips over the host bus. That is, the data may be routed over the PCI bus several times to pass the data to various components that process the data. In addition, the use of an independent device for the cryptographic engine adds a relatively significant cost to the host system. Furthermore, it may be relatively difficult to implement such a system in tandem with a TCP offload engine (or a Layer 5 device) because IPsec is a Layer 3.5 process that, in effect, would sit in the midst of the TCP offload engine ("TOE").

Also, integration of the cryptographic engine into an Ethernet controller may add significant cost to the Ethernet controller. Given that the extent of the market's adoption of cryptography may be significantly less than the market's adoption of Ethernet controllers, such integration may not be economically justifiable.

Coupled with the need to improve the operating speed and lower the cost of conventional cryptographic technology in general, there is a need to provide cryptographic processing to support faster data transfers defined by various data communication standards. In an attempt to address the perpetual need for faster data communications, various groups are continuously developing standards that specify high-speed data transfers between components of data communication systems. For example, IEEE standards 802.3ab and 802.3z define Ethernet systems for transferring data at rates up to one gigabit per second (1 Gbit/s). IEEE standard 802.3ae defines an Ethernet system for transferring data at rates up to 10 Gbits/s.

The development of these standards and the ever increasing need for faster data transfers create a need for techniques and circuits capable of achieving high data transfer rates in a secure environment. Moreover, there is an ever-present economic motivation to achieve such results in a cost effective and adaptable manner. Accordingly, a need exists for improved data security processing techniques to support data transmission over data networks.

SUMMARY

The invention relates to methods and associated systems for providing secured data transmission over a data network. For example, a device constructed according to the invention may provide security processing in the data path. Thus, the device may include at least one network interface to send packets to and receive packets from a data network and at least one cryptographic engine for performing encryption and/or decryption and/or authentication operations. For convenience, the encryption and/or decryption and/or authentication operations may be abbreviated herein as encryption/decryption/authentication, etc.

Moreover, a device constructed according to the invention may be configured as an in-line security processor so that it processes packets that pass through the device, as the packets are being routed through the data network. Thus, packets from the network passing through the device are intercepted, then encrypted and/or decrypted and/or authenticated as necessary, then forwarded out onto the network.

In some embodiments, the in-line security processor may be, in effect, transparent to associated host processing components. For example, in some embodiments, the security processor is located between a network controller and a network connection. Here, the security processor may perform IPsec operations on inbound or outbound packet traffic with little or no involvement by the host processor and/or network controller.

For example, the security processor may process incoming IPsec packets by processing the IPsec header information, locating locally stored security association information using information from the packets, performing the appropriate cryptographic operations, and removing the IPsec header and trailer and adjusting IP header fields. Thus, the security processor sends standard, unencrypted TCP/IP packets to the network controller and the host processor.

For outbound packets, a system may incorporate varying degrees of interaction between the host processor, network controller and security processor. In one embodiment, the security processor is essentially transparent to the other components. Here, the security processor receives TCP/IP packets from the network controller, autonomously performs the cryptographic operations and adds the appropriate IPsec header and trailer to the packet. In another embodiment, the host processor and/or network controller add information to the packets sent to the security processor. This information may, for example, indicate which security association is to be used to encrypt/authenticate the packet. In another embodiment, the host processor and/or network controller adds the appropriate IPsec header and trailer to the packet. In this case, the security processor performs the cryptographic operations, updates the IPsec header and trailer and changes the payload, if necessary.

One embodiment of a system constructed according to the invention relates to an Ethernet security processing system including a host processor, an Ethernet controller and an in-line security processor. Packets flow from the host processor and Ethernet controller over a network connection to the in-line security processor, then out to the network. In a similar manner, packets from the network flow through the in-line security processor then over a network connection to the Ethernet controller and host processor. In one embodiment, the in-line security processor analyzes information in the received packets to determine whether the packets are to be encrypted/decrypted/authenticated or are to be forwarded through the in-line security processor. In one embodiment, the in-line security processor analyzes flow information in the packets to identify the appropriate security association information that is to be used to encrypt/decrypt/authenticate the packets.

In the embodiments discussed in the above paragraph, the in-line security processor may, in effect, be essentially transparent to the Ethernet controller. For example, the Ethernet controller may not need to be adapted to cooperate with the in-line security processor.

In another embodiment of a system constructed according to the invention, the Ethernet controller and/or host processor performs operations that enable the security processor to more efficiently locate security association information that is to be used to encrypt/decrypt/authenticate packets. For example, the Ethernet controller may identify the flow associated with a packet and generate information relating to the security association for that flow. The Ethernet controller may then send that information with the packet to the security processor.

One embodiment of this aspect of the invention relates to adding one or more headers to a standard TCP/IP packet to provide an efficient manner for a security processor to locate security association information for a packet. Such headers may include, for example, an Ethernet header including the address of the security processor and a security frame header including a reference to an address of a security association. The security processor may then use the reference to retrieve security association information from a local data memory.

In some embodiments, the in-line security processor processes information in packets received from the network to locate security association information that is to be used to encrypt/decrypt/authenticate the packets. In one embodiment, the security processor uses a security parameter index ("SPI") embedded in the packet to locate security association information stored in a table in a data memory located in or associated with the security processor. In one embodiment, the security processor hashes flow information embedded in the packet to locate the security association information in the table.

In one embodiment of a system constructed according to the invention the security processor includes at least one MAC/PHY interface to interface with an Ethernet network. In some embodiments, these interfaces are gigabit MAC/PHY interfaces that can interface with a gigabit Ethernet network.

One embodiment of a system constructed according to the invention includes a gigabit Ethernet controller in combination with a gigabit security processor. The gigabit security processor performs IPsec operations. The gigabit Ethernet controller provides the network interface for a host processor and may also perform IP and TCP processing for the host processor. In this case, the gigabit Ethernet controller may send data flow information to the security processor to assist the security processor in performing IPsec operations. For example, the data flow information may include an address of security association data (e.g., encryption/decryption/authentication keys) associated with each data flow. In one embodiment, the data flow information is sent in a packet header that encapsulates the packet to be encrypted/decrypted/authenticated.

In one embodiment of a system constructed according to the invention a security processor may be configured using packets sent over the data network. For example, the security processor may be configured with IPsec configuration packets. Hence, a host processor may manage the security processor over a network. This may eliminate a need for an external processor for configuring the security processor. Moreover, the host processor may configure the security processor without specific "knowledge" of the physical location of the security processor. Rather, the host processor may simply send configuration packets to its network controller. The network controller may then, in turn, forward the packets to the security processor via the network.

In one embodiment of a system constructed according to the invention one or more security processors may be configured to support one or more host processors and/or Ethernet controllers. For example, packets for several host processors and/or Ethernet controllers may be sent through a switch that, in turn, routes the packets to/from a single security processor. Also, several security processors may be used to support IPsec processing for high data rate networks (e.g., 10 Gbits/s).

By providing network connectivity with the security processor, it should be appreciated that a system constructed according to the invention may locate the cryptography components throughout a network. For example, in some embodiments a security processor may be co-located with a network controller (e.g., Ethernet controller). In some embodiments, a security processor and a network controller may be located on different sides of one or more switches.

A system constructed according to the invention may provide high performance in-line cryptography that may operate seamlessly with a higher layer controller such as TOE, iSCSI, RNIC, etc. In implementations where cryptography is not needed, this architecture may add no cost to the implementations since the other system components may not need to be modified to support cryptography. For example, in some embodiments no modifications are made to the network controller. Hence, the cost of the network controller is not affected. In some embodiments, negligible modifications are made to the network controller to support cryptography (e.g., IPsec). These embodiments simplify the design of the cryptography (e.g., the security processor) thereby providing lower cost cryptography while adding relatively negligible cost to the network controller. Moreover, the cryptography may be implemented in a flexible manner as it may be co-located or reside on a locally accessible and physically or logically secured network.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
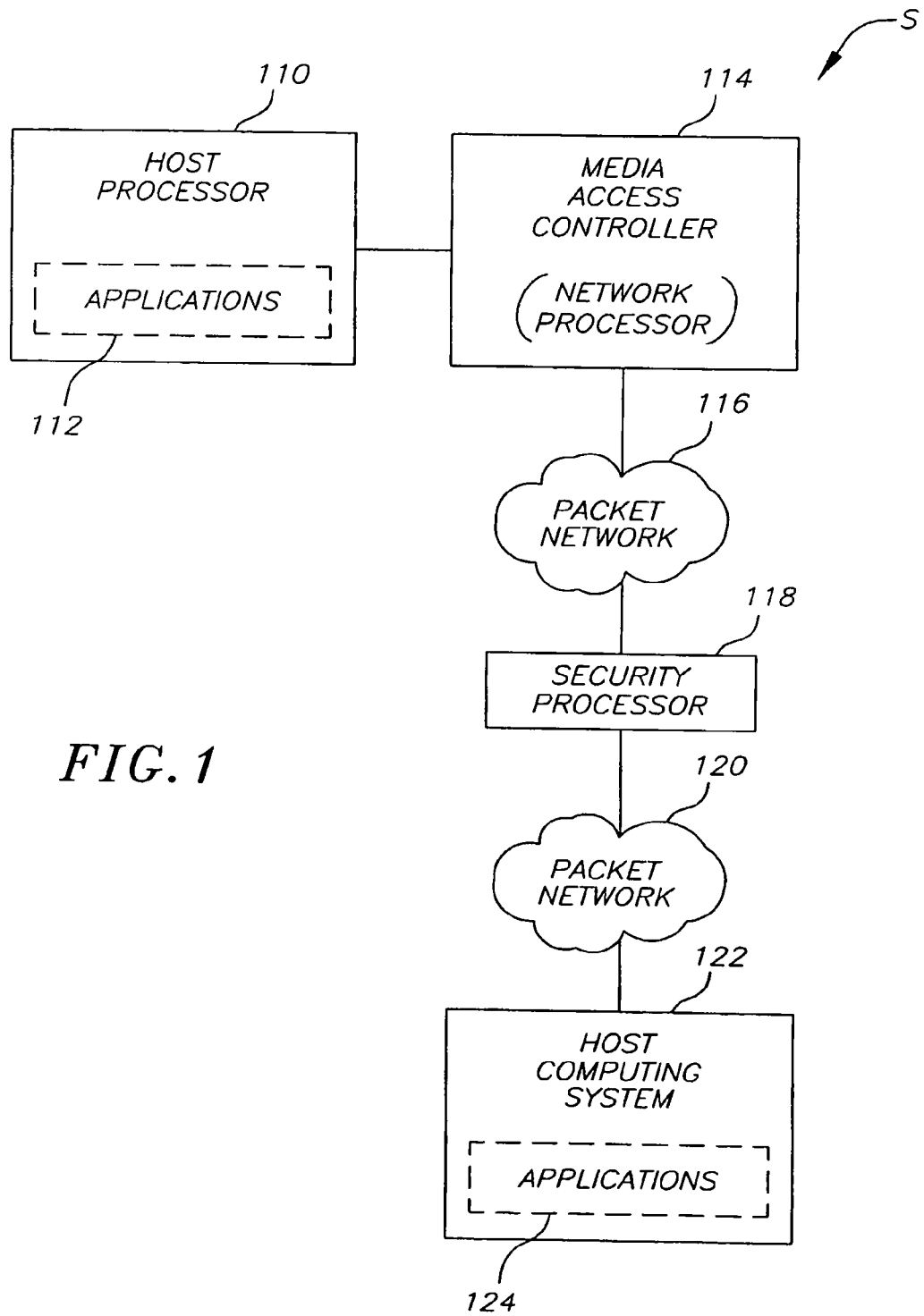
FIG. 1 is a block diagram of one embodiment of a security processing system constructed in accordance with the invention.

FIG. 1 is a block diagram of one embodiment of a security processing system S constructed according to the invention. A security processor 118 in the system S is installed in the data path of a packet network to provide encryption, decryption, authentication and other security functions for data flowing through the packet network. The portions of the packet network connected to each side of the security processor 118 are labeled as packet network 116 and packet network 120. As used herein, the term security processor refers to one or more processing components that encrypt, decrypt or authenticate data or perform any combination of these operations.

In the example of FIG. 1 data flows through the packet network between applications 112 executing on a host processor 110 and applications 124 executing on a host computing system 122. A media access controller (represented by block 114) provides, for example, ISO Layer 2 processing to provide the network interface for the host processor 110. In other embodiments, the block 114 may provide ISO Layer 3 and/or Layer 4 and/or Layer 5 processing or processing for parts of those layers. For example, the block 114 may be a network processor (e.g., network controller). The host processor 110 and a network processor 114 may cooperate to provide packet processing to enable the applications 112 to send and receive data over the packet network. The host computing system 122 performs similar packet operations as well as security operations complementary to those performed by the security processor 118. To reduce the complexity of FIG. 1 the components that perform these packet and security operations are not depicted in the host computing system 122.

The security processor 118 and the security operations of the host computing system 122 cooperate to securely transmit selected data over the packet network 120. To this end, the security processor 118 and the host computing system 122 encrypt and/or authenticate the selected data before sending it over the packet network 120. In one embodiment, these security components generate IPsec packets. When the security processor 118 and the host computing system 122 receive encrypted/authenticated packets they decrypt and/or authenticate the packets and forward them to the applications 112 and 124, respectively. For example, when the security processor 118 receives authenticated packets it may check the authentication of those packets before it forwards the packets to the host computing system 110.

The security processor 118 includes network interface components (not shown) to enable the security processor 118 to send and receive data over the packet network. One network interface connects to the packet network 116 and another network interface connects to the packet network 120. In this way, the security processor 118 is in-line with the data path of the packet network 116 and 120. In contrast, traditional security processors connect to network processors via separate busses (e.g., a PCI bus or a POS-PHY interface) and are, therefore, outside the data path of the network.

A device constructed according to this embodiment of the invention may provide several advantages over conventional systems. A security processor may be shared among several host processors. In addition, several security processors may be configured to provide security services for a high-speed network. Also, the security processor may be located at a location that is remote from the location of the host processor. In this case, the network between the host processor and the security processor may need to provide a certain level of security. For example, a cryptographic "secret" may be shared between the host processor and the security processor. The host processor and the security processor may use this "secret" to protect the configuration information, the status or errors reported, and/or other information transmitted between the host processor, the network controller and the security processor.

A device constructed according to this embodiment of the invention may be configured via the packet network. For example, the host processor 110 may send IPsec configuration packets to the security processor 118 via the packet network 116. In addition, data used by the security processor 118 may be sent to the security processor 118 via the packet network. For example, the host processor 110 and/or the network processor 114 may send packets containing security associations and information related to the security associations (e.g., the addresses of the security associations) to the security processor 118 via the packet network 116.

One implementation of the embodiment of FIG. 1 consists of a network interface card ("NIC") that connects to a motherboard of a computer system. The host processor resides on the motherboard and the network processor and the security processor reside on the NIC. In this implementation the packet network 116 may consist of a connection between the network processor and the security processor.

One implementation of the embodiment of FIG. 1 consists of a LAN-on-Motherboard configuration. Here, the host processor and the network processor reside on the motherboard. In this case, the security processor may be implemented on the motherboard or may be implemented as a separate component that connects to the network processor.

Typically, the packet network of FIG. 1 would be an Ethernet network. In this case the network processor 114 may be implemented as an Ethernet controller that offloads Ethernet processing and other functions from the host processor 110. In addition, the security processor 118 may support IPsec. It should be understood, however, that the invention may be practiced using other types of networks, network interfaces and security protocols.

Figure 2:
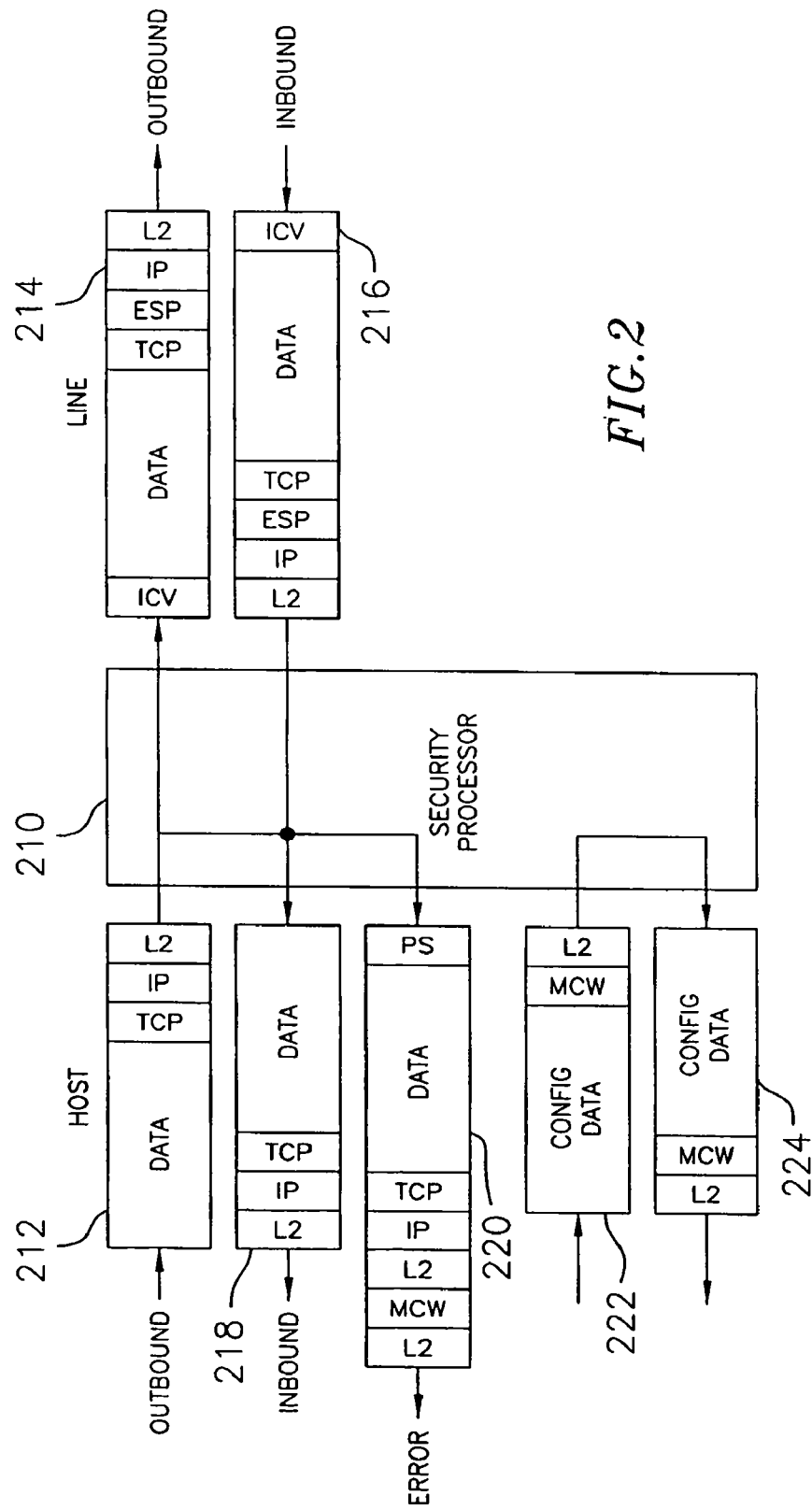
FIG. 2 is a block diagram illustrating one embodiment of packet data flow in the embodiment of FIG. 1.

FIG. 2 illustrates one embodiment of TCP/IP and IPsec packet flow to and from a security processor 210. In this example, outbound packet flow refers to packets sent from an Ethernet controller (not shown) to a packet network (not shown). Inbound packet flow refers to data received from the packet network flowing to the Ethernet controller.

The security processor 210 performs IPsec processing on a packet 212 received from the Ethernet controller and generates a packet 214 that is output to the packet network. The packet 212 includes header information (L2, IP, TCP) and data. A portion of this header information (e.g., TCP) and the data may be encrypted/authenticated during IPsec processing by the security processor 210. The output packet 214 includes the encrypted/authenticated packet information (e.g., TCP, data), security information (ESP, ICV) and other header information (L2, IP).

In a complementary operation, the security processor 210 performs IPsec processing on a packet 216 received from the packet network and generates a packet 218 that is output to the Ethernet controller. The security processor 210 decrypts/authenticates the encrypted/authenticated packet information (e.g., TCP, data) from the packet 216 and encapsulates the decrypted/authenticated packet information (e.g., TCP, data) into the packet 218. Thus, the operation of an IPsec compliant security processor may include adding and/or removing IPsec protocol elements including, for example, headers, trailers and/or other data.

The security processor 210 may be configured using packets received over the packet network. A configuration packet 222 contains configuration data, a master control word ("MCW") and Layer 2 header information L2. If desired, the security processor 210 may be set up to send configuration packets 224 back to the Ethernet controller.

The security processor 210 may be initially configured so that it is configurable only from a "trusted" side of the network. This prevents unauthorized parties from altering the configuration of the security processor 210 by hacking into the controller from the public network. In the example of FIG. 2, the trusted (or secure) side is referred to as the "host" side and the other non-trusted (or non-secure) side, the "line" side. Hence, the security processor 210 may be configured using packets received from the Ethernet controller.

Typically, the security processor 210 will include maintenance and error handling capabilities. For example, loopback paths are provided for inbound, outbound and configuration packets. In addition, the security processor 210 sends error packets 220 to the Ethernet controller. In one embodiment, the error packets may include an MCW.

A system constructed according to the invention may provide several advantages over conventional systems. Simpler integration with other networking components may be achieved. As opposed to some PCI bus security processor implementations, traffic need not pass through the PCI bus up to three times. As opposed to some POS-PHY security processor implementations, multiple packets need not be buffered to converge two bi-directional connections into a single bi-directional connection. Thus, buffering and bandwidth problems may be reduced. Multiple connection technologies in a NIC may be avoided with the elimination of the POS-PHY interface. Relatively simple frame formats may be supported. A security processor may be located remotely. Thus, the security processor may be shared and/or dynamically allocated. These advantages are merely representative of advantages of invention. The invention is not limited to these advantages.

Figure 3:
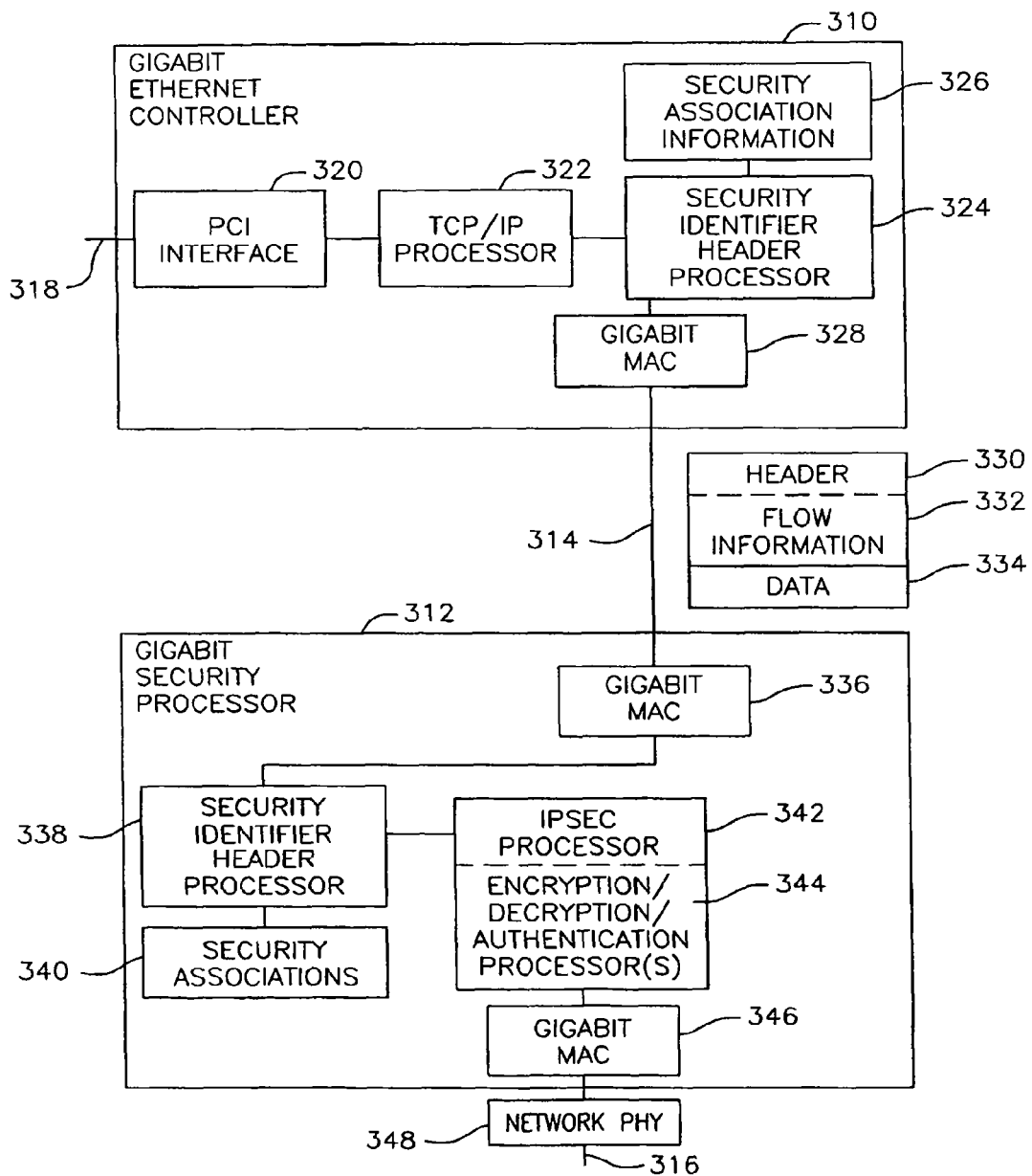
FIG. 3 is a block diagram of one embodiment of a Gigabit network interface system constructed in accordance with the invention.
Figure 4:
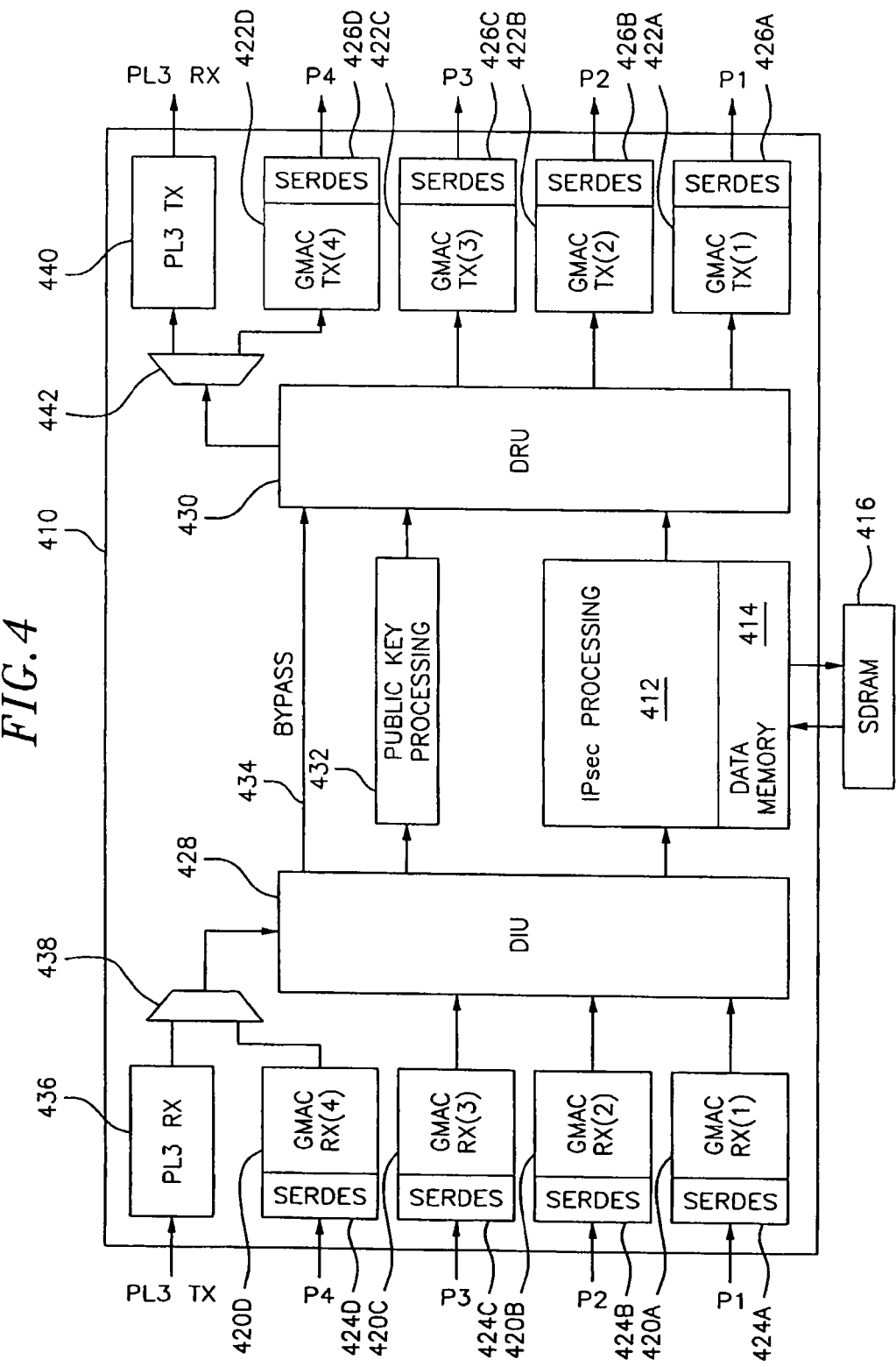
FIG. 4 is a block diagram of one embodiment of a security processor constructed in accordance with the invention.
Figure 5:
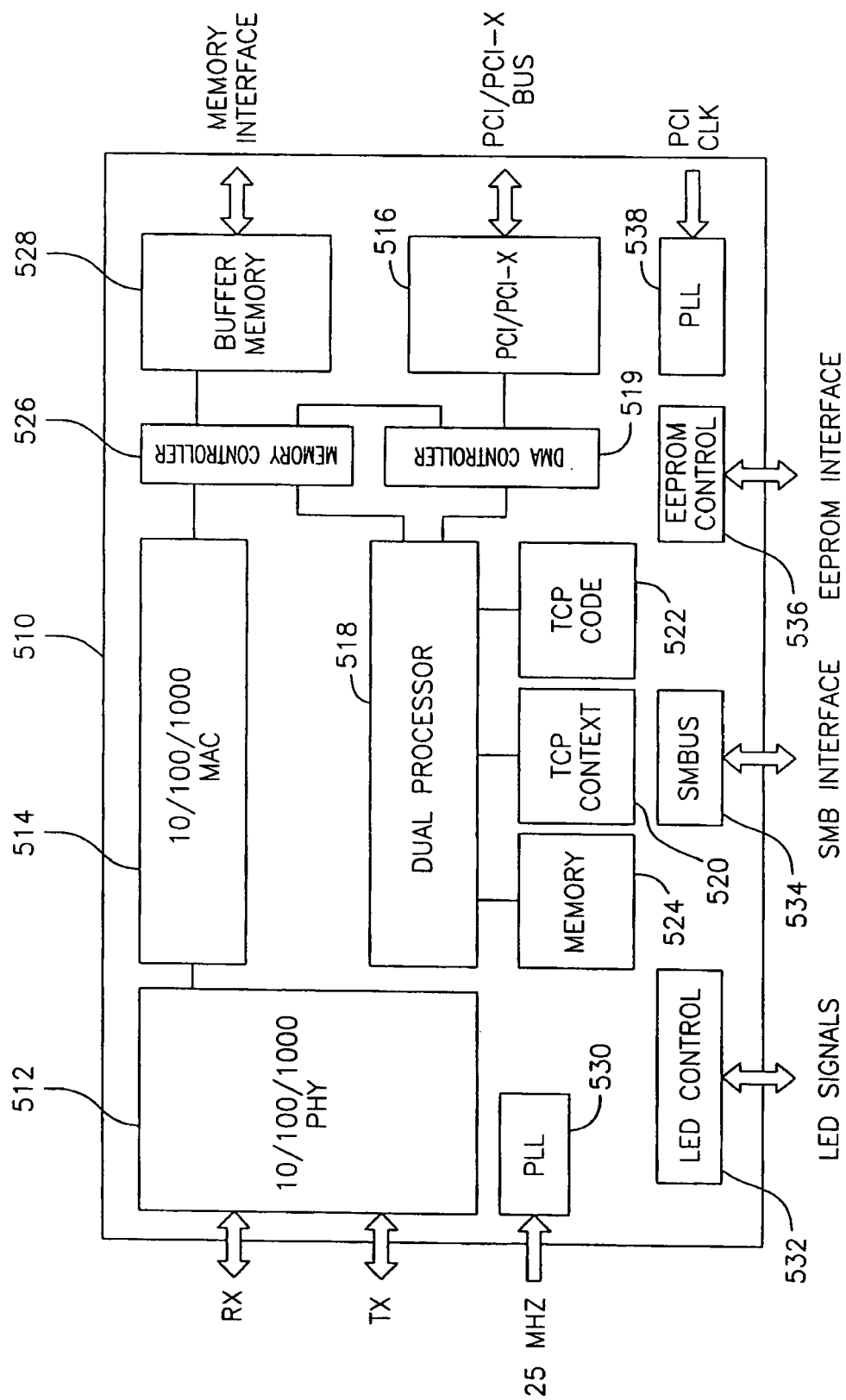
FIG. 5 is a block diagram of one embodiment of an Ethernet controller constructed in accordance with the invention.

Referring now to FIGS. 3-5, one embodiment of a secure network interface for a Gigabit Ethernet application will be discussed. Such an embodiment may support, for example, IEEE standards 802.3ab, 802.3z and/or 802.3ae or any other speed or physical layer (e.g., SERDES).

This embodiment of the invention may be implemented as a NIC that connects to a bus 318 (e.g., PCI, PCI-X or PCI-Express, referred to hereafter generally as a PCI bus) of a host computer (not shown) to connect the host computer to a Gigabit Ethernet network 316. The NIC includes a network processor (Gigabit Ethernet controller 310) and a Gigabit security processor 312. The controller 310 and the processor 312 may be implemented on the NIC in one or more integrated circuits.

The Gigabit Ethernet controller 310 includes standard controller components for interfacing with the busses. A PCI interface 320 provides connectivity to the PCI bus 318. A Gigabit MAC 328 provides connectivity to a Gigabit Ethernet network 314.

In addition, the Gigabit Ethernet controller 310 may include components for offloading TCP operations from the host processor (not shown). For example, the Gigabit Ethernet controller 310 may include a TCP/IP processor 322 that performs, for example, various TOE operations, packet assembly for outbound packets and packet disassembly for inbound packets.

As depicted in FIG. 3, the Gigabit Ethernet controller 310 may include components that enable the Gigabit security processor 312 to more efficiently identify packets that are to be encrypted/authenticated and to locate security association information for those packets. For example, the Gigabit Ethernet controller 310 may generate and/or store indexes to the security associations used by the Gigabit security processor 312. To accelerate the operation of the Gigabit security processor 312, the Gigabit Ethernet controller 310 may send these indexes to the Gigabit security processor 312 via a security identifier header.

The Gigabit Ethernet controller 310 also may perform operations to account for packet overhead (e.g., added IPsec headers, padding and trailer) that may be associated with the cryptography operations. For example, the Gigabit Ethernet controller 310 may support an updated path maximum transmitted unit ("MTU") size that takes into account the size of the IPsec header and trailer added by the Gigabit security processor 312. In this case, the Gigabit Ethernet controller 310 may reduce the payload size accordingly. In embodiments where the Gigabit Ethernet controller 310 adds a security identifier header, the Gigabit Ethernet controller 310 will further reduce the MTU for transmitted frames accordingly. This may prevent creating IP fragments. In the embodiment of FIG. 3, some or all of these operations may be performed by a security identifier header processor 322.

The Gigabit security processor 312 includes several components that support and perform cryptography (e.g., IPsec) operations. For example, an IPsec processor 342 processes packets associated with secure sessions. In some embodiments, the IPsec processor 342 incorporates one or more encryption/decryption/authentication processors 344 that encrypt, decrypt and/or authenticate packets received over the networks 314 and 316. Security associations 340 used in the encryption/decryption/authentication operations are stored in internal and/or external data memory (not shown). A security identifier header processor 338 may be used to process security identifier headers received from the Gigabit Ethernet controller 310 to locate the security associations 340.

The Gigabit security processor 312 also includes Gigabit MAC interfaces 336 and 346 for connecting the processor 312 to the Gigabit Ethernet networks 314 and 316, respectively. In one embodiment the GMAC interfaces 336 and 346 comprise 10/100/1000 Gigabit media access controllers ("GMACs") that are used in conjunction with integrated serializer/deserializers ("SERDES").

In one embodiment, the Gigabit security processor 312 interfaces with the network 316 via a network PHY 348. In addition, Gigabit PHY interfaces (not shown) may be associated with the Gigabit MACs 328 and 336 depending on the physical characteristics of the connection 314. For example, if the Gigabit Ethernet controller 310 and the Gigabit security processor 312 are located on a common circuit board they may be connected without a full implementation of a Gigabit Ethernet PHY. If the Gigabit Ethernet controller 310 and the Gigabit security processor 312 are located remotely from one another via a Gigabit Ethernet network, a full implementation of a Gigabit Ethernet PHY may be used.

In some embodiments, the PHY interfaces may be incorporated into the same integrated circuit as the MACs. For example, the PHY 348 may be incorporated into an integrated circuit for the Gigabit security processor 312 that includes the Gigabit MAC 346. Further to the above, the components of FIG. 3 may be implemented in various configurations. The processors 322, 324, 338 and 342 and other components of the Gigabit Ethernet controller 310 and the Gigabit security processor 312 may be implemented, for example, in hardware and/or as software code executing on one or more processors. Some or all of these components may be implemented on one or more integrated circuits and/or on common or separate circuit boards such as NIC and LAN-on-Motherboard solutions.

The incorporation of the GMAC ports into the security processor gives it the capability to process data directly from the wire. A brief description of data flow through the system of FIG. 3 for a secure session follows. The host sends application data to the Gigabit Ethernet controller 310 via the PCI bus 318. The Gigabit Ethernet controller 310 encapsulates the data to form TCP/IP packets and sends the outbound packets to the Gigabit security processor 312 via connections 314 on the NIC. The Gigabit security processor 312 performs IPsec operations on the packets. These operations include encrypting/authenticating the packets, and encapsulating the encrypted/authenticated packets into IPsec packets by, for example, adding the IPsec header and trailer. These operations also may include updating the IP protocol field to point to the appropriate IPsec header type and compute and place the IP checksum when applicable (e.g., for IPv4) as it changes due to the presence of IPsec fields. These operations also may include modifying other IP header fields such as IP length, as necessary. After these operations are performed, the Gigabit security processor 312 sends the resulting IPsec packets to the Gigabit network 316.

Complementary operations are performed on inbound IPsec packets. The Gigabit security processor 312 performs IPsec operations on IPsec packets received from the Gigabit network 316. These operations include unencapsulating the IPsec packets and decrypting/authenticating the encrypted/authenticated packets. After removing the IPsec header and trailer, the Gigabit security processor 312 may reset the IP protocol field to 6 (for TCP), recalculate the IP checksum (for IPv4) and replace the IP checksum with the newly calculated value The Gigabit security processor 312 sends the decrypted/authenticated packets to the Gigabit Ethernet controller 310 via connections 314. The Gigabit Ethernet controller 310 then strips the TCP/IP packet header from the packet and sends the data to the host via the PCI bus 318.

In one embodiment, the Gigabit security processor 312 and the Gigabit Ethernet controller 310 include security identifier header processors 338 and 324, respectively, for processing special packet headers for packets associated with secure sessions. For outbound data, the security identifier header processor 324 encapsulates the outbound TCP/IP packets with an outer security identifier header 330. Thus, the original TCP/IP packets comprise at least a portion of the data 334 for new packet.

The security identifier header 330 may include, for example, information that identifies the Gigabit security processor 312. In one embodiment, this information consists of an address assigned to the Gigabit security processor 312.

The security identifier header 330 also may include flow information 332 related to the secure session. In one embodiment, the flow information 332 includes the address of the security association that the Gigabit security processor 312 must use to encrypt/authenticate the outbound TCP/IP packet. The Gigabit Ethernet controller 310 may generate this security association information when it builds the TCP/IP packets for the secure session. In this case, the Gigabit Ethernet controller 310 typically stores the security association information 326 with context information for the secure session.

The security identifier header processor 338 checks the packet to determine whether it should process the packet. For example, the security identifier header processor 338 may read the security identifier header to determine whether the header includes the address of the Gigabit security processor 312. If so, the security identifier header processor 338 retrieves the flow information 332 and strips the security identifier header 330 from the packet. The security identifier header processor 338 then retrieves the security association 340 identified by the flow information 332 and sends the TCP/IP packet and the security association to the IPsec processor 342. The IPsec processor 342 then encrypts/authenticates the TCP/IP packet using the security association 340 and formats the encrypted/authenticated packet into an IPsec packet.

In embodiments that use the security identifier header and flow information described herein, the Gigabit security processor 312 may not need to perform computationally intensive security association lookup operations for outbound traffic. As a result, the outbound operations to be performed by the Gigabit security processor may essentially be limited to encryption/authentication, updating the IP header as described above, replacing the payload and inserting the trailer values when applicable.

By supplying flow information in the packets, the embodiment described above provides an advantageous security processing solution. For example, as discussed below the system may meet fixed latency times for security association lookup and memory requirements may be reduced. In addition, this technique provides an effective manner of obtaining TCP information when the TCP functionality is provided in a hardware device. In the embodiment described above the TCP information does not need to be provided via a separate bus or a side-band path.

FIG. 4 illustrates one implementation of a Gigabit security processor 410 that may provide the functionality of Gigabit security processor 312. This implementation includes quad 10/100/1000 GMACs (receivers 420A-D, transmitters 422A-D) with integrated SERDES (receivers 424A-D, transmitters 426A-D). Each of the GMACs may be configured to interface with a host side network or a line side network. The network inputs and outputs for the GMACs are labeled P1-P4.

The Gigabit security processor 410 also includes a PL3 interface. The input to the PL3 receiver 436 is labeled PL3 TX. The output of the PL3 transmitter 440 is labeled PL3 RX.

One of the GMACs may be swapped with a PL3 interface. On the receive side, this is accomplished by a multiplexer 438 that selects either the signal from PL3 receiver 436 or the GMAC RX(4) 420D to be sent to a data input unit ("DIU") 428. On the transmit side, a demultiplexer 442 sends output data from a data routing unit ("DRU") 430 to either the PL3 transmitter 440 or the GMAC TX(4) 422D.

The DIU 428 manages packet flow from the receiver inputs into the processing path of the Gigabit security processor 410 and may extract and process header information. Packets may be routed to a bypass path 434, for example, when no security processing is necessary. This would be the case for non-IPsec packets flowing through the Gigabit security processor 410. Packets may be routed to a public key processing component 432. Packets also may be routed to an IPsec processing component 412. The Gigabit security processor 410 includes an internal data memory 414 as well a memory interface component to access external data memory such as a serial dynamic random access memory ("SDRAM") 416. Additional details of one embodiment of the processing path of a Gigabit security processor are described in U.S. patent application Ser. No. 09/610,798 filed on Jul. 6, 2000 and entitled "DISTRIBUTED PROCESSING IN A CRYPTOGRAPHY ACCELERATION CHIP," the disclosure of which is hereby incorporated by reference herein.

The DRU 430 manages data from the processing path of the Gigabit security processor 410 to be sent to the device outputs. Thus, the DRU 430 routes packets to the GMAC transmitters 422A-C and the demultiplexer 442.

FIG. 5 illustrates one implementation of a Gigabit Ethernet controller 510 that may provide the functionality of Gigabit Ethernet controller 310. This implementation includes processor or processors 518 (hereafter generally "processor 518") for performing, among other tasks, TCP processing. Executable code for the TCP processing is stored in a data memory 522.

The processor 518 stores TCP context information in a data memory 520 (e.g., a dedicated memory). The data memory 520 may be accessible by all components of the Gigabit Ethernet controller 510 that may need access to data stored in the data memory 520. A data memory 524 provides additional data storage for the processor 518.

As discussed herein, the TCP context information may include flow and/or security association information that the Gigabit Ethernet controller 510 uses and/or sends to the Gigabit security processor 410. For example, this information may include the security association information 326 and/or flow information 332 discussed above in conjunction with FIG. 3.

Data flow in the Gigabit Ethernet controller 510 is controlled, in part, by a memory controller 526 and a DMA controller 519. For example, the DMA controller 519 is involved in managing data flow between the Gigabit network and the PCI bus. A PCI/PCI-X interface 516 interfaces with the PCI/PCI-X bus that connects to the host computer (not shown). The memory controller 526 also controls access to an internal buffer memory 528 and an optional external data memory accessed via a memory interface.

The Gigabit Ethernet controller 510 also includes various support components. Phase lock loop circuits 530 and 538 provide clocks for the processor 510. The processor 510 includes interfaces for external EEPROM 536, an SMBus 534 and LEDs 532.

Additional details of embodiments of network interface and TOE structures and operations are described in the following U.S. patent applications: U.S. patent application Ser. No. 10/652,267, entitled "SYSTEM AND METHOD FOR TCP OFFLOAD," filed on Aug. 29, 2003; U.S. patent application Ser. No. 10/652,330, entitled "SYSTEM AND METHOD FOR NETWORK INTERFACING," filed on Aug. 29, 2003; U.S. patent application Ser. No. 10/652,327, entitled "NETWORK INTERFACING IN A MULTIPLE NETWORK ENVIRONMENT," filed on Aug. 29, 2003; and U.S. Provisional Patent Application No. 60/456,265 filed Mar. 20, 2003. Each of these patent applications is assigned to the same assignee as this application. The disclosures of these applications are hereby incorporated by reference herein.

Figure 6:
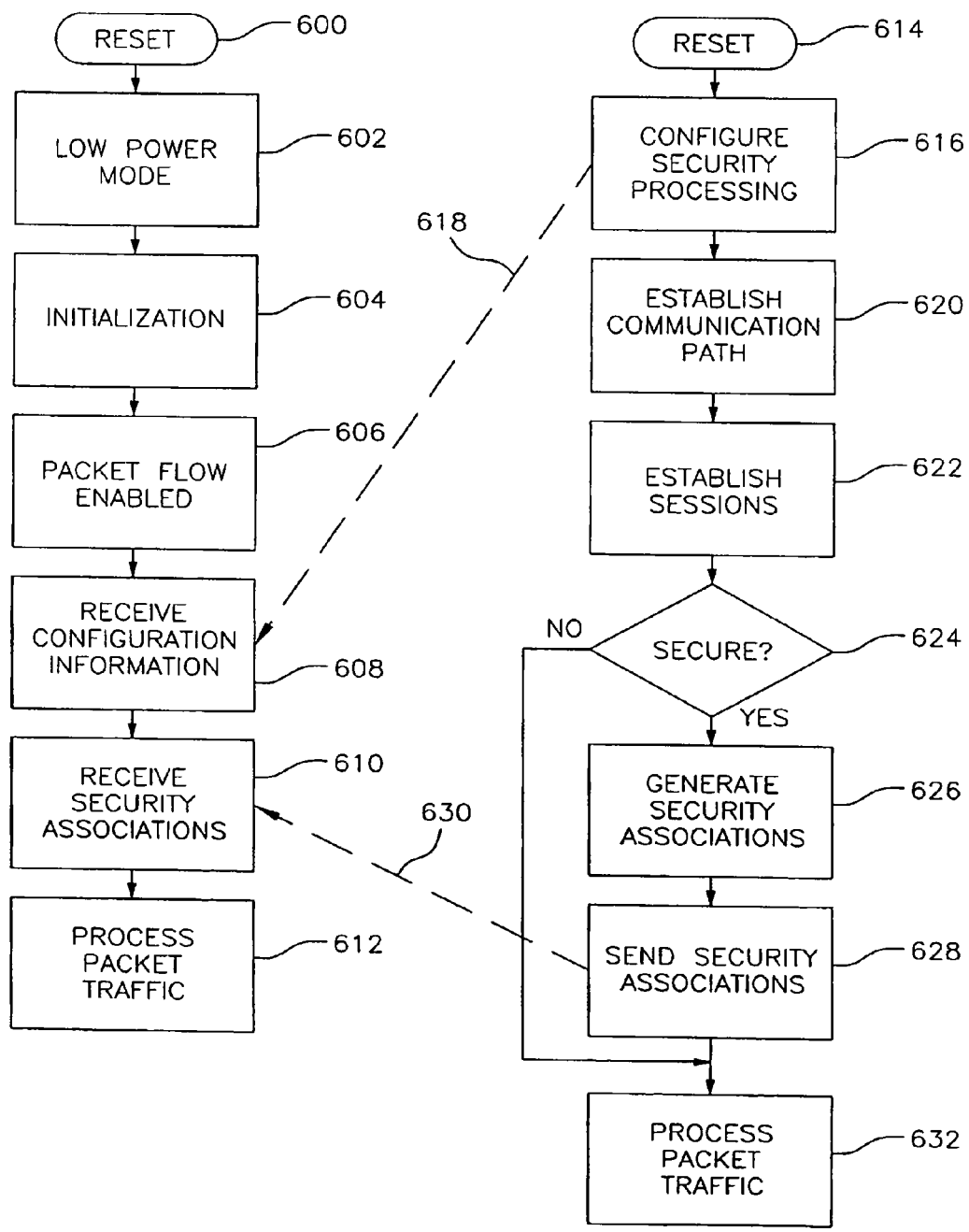
FIG. 6 is a flowchart representative of one embodiment of initialization and configuration operations that may be performed in accordance with the invention.
Figure 7:
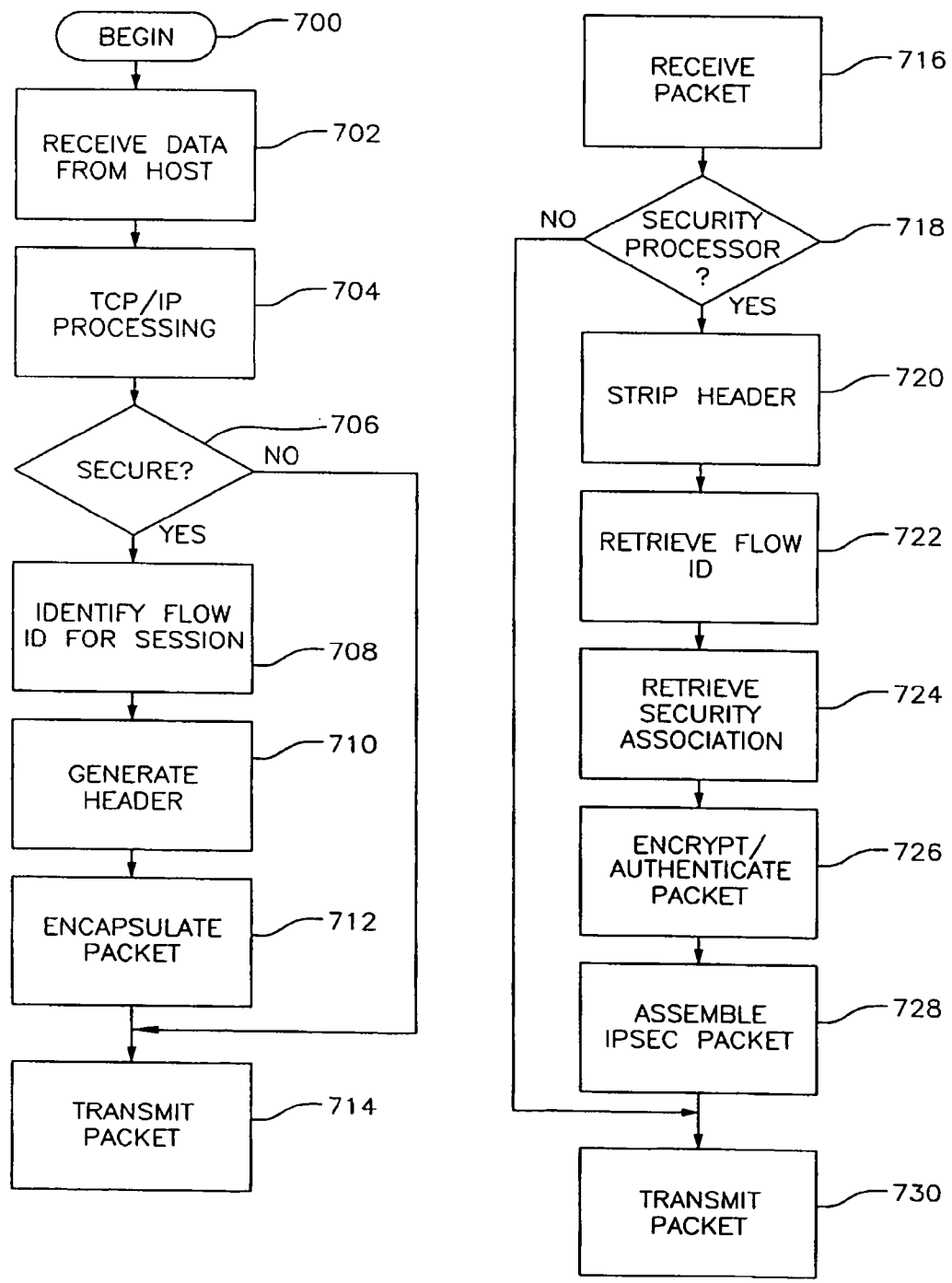
FIG. 7 is a flowchart representative of one embodiment of outbound processing operations that may be performed in accordance with the invention.
Figure 8:
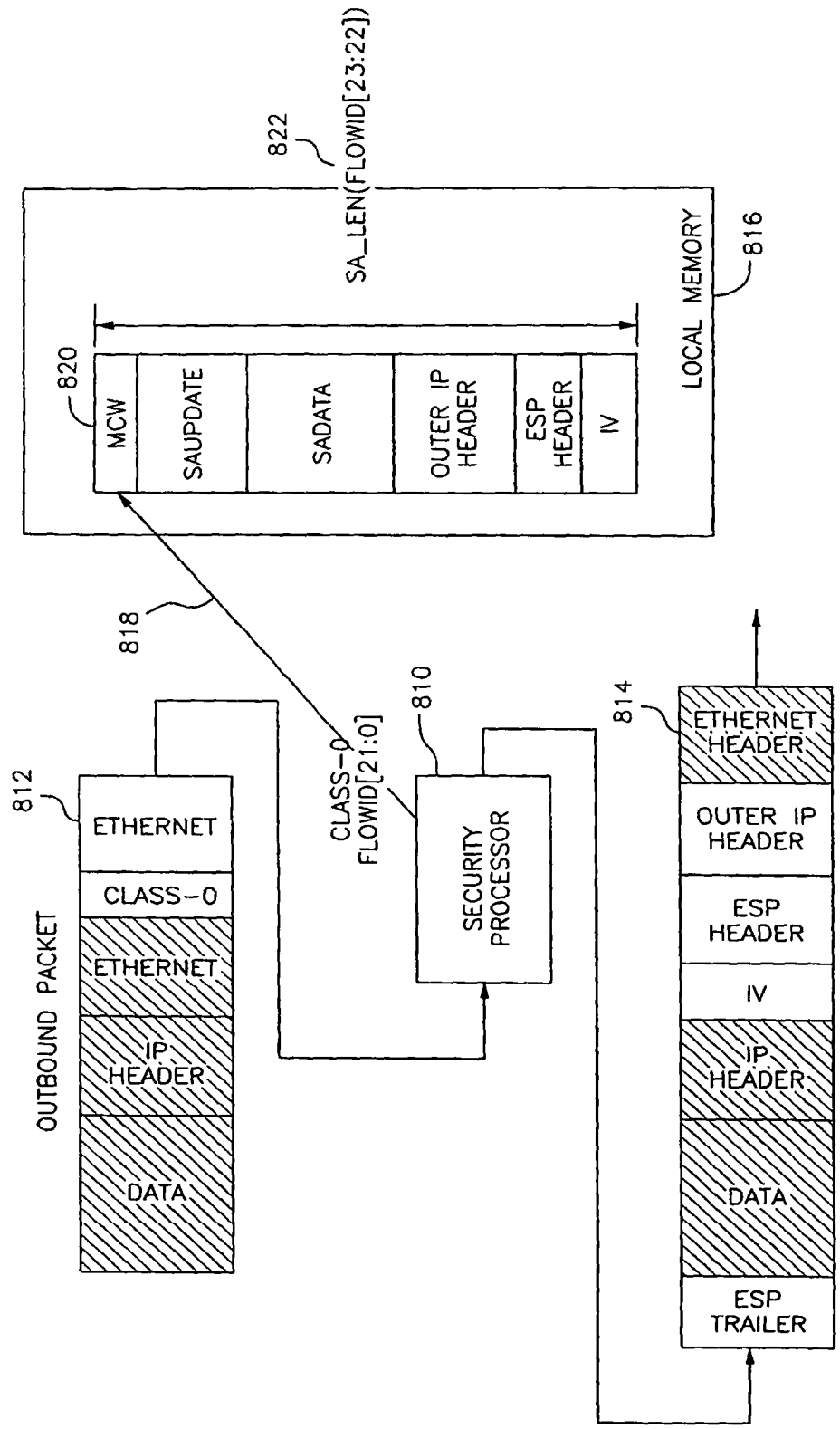
FIG. 8 is a block diagram representative of one embodiment of outbound processing flow in accordance with the invention.
Figure 9:
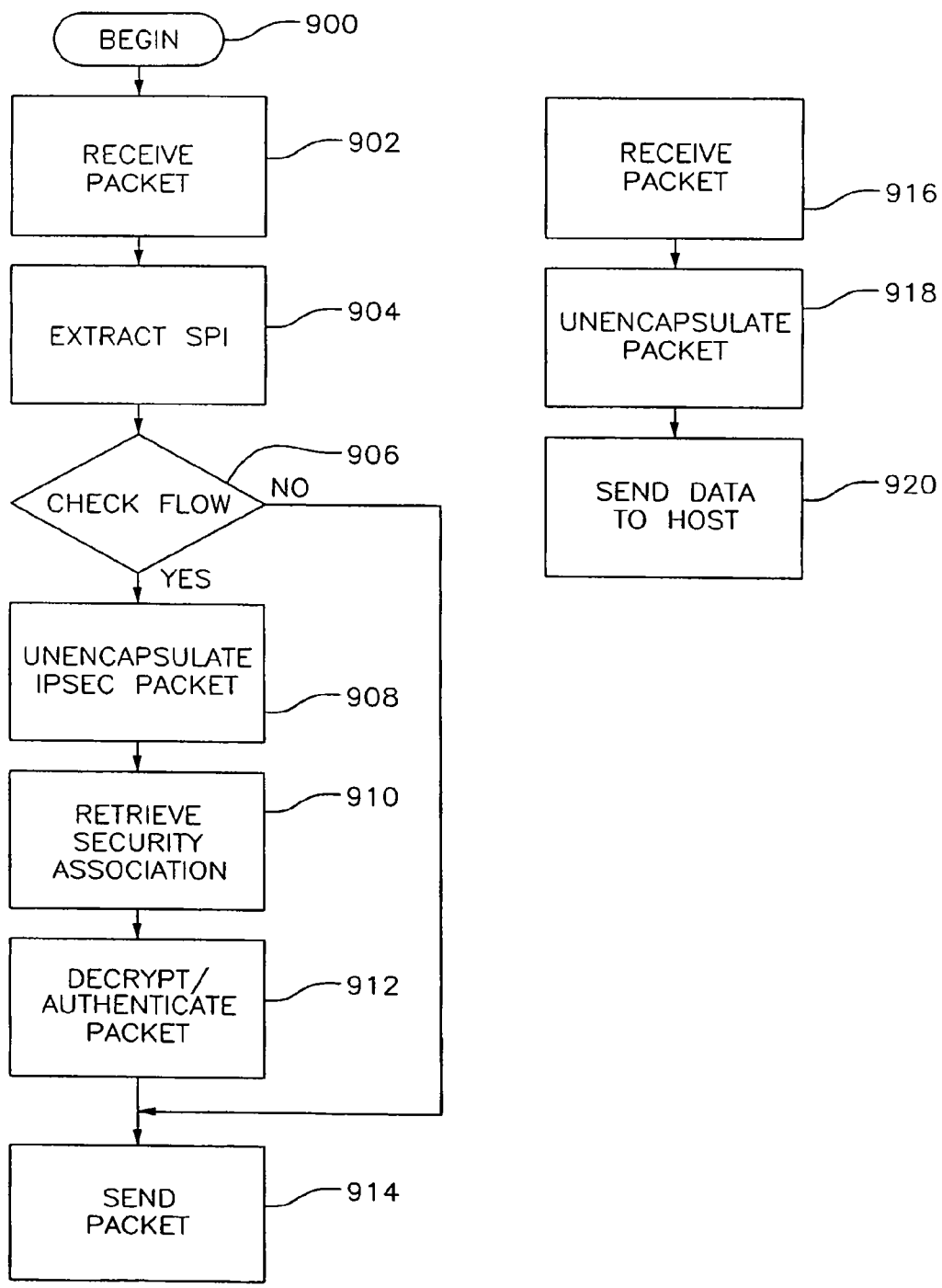
FIG. 9 is a flowchart representative of one embodiment of inbound processing operations that may be performed in accordance with the invention.
Figure 10:
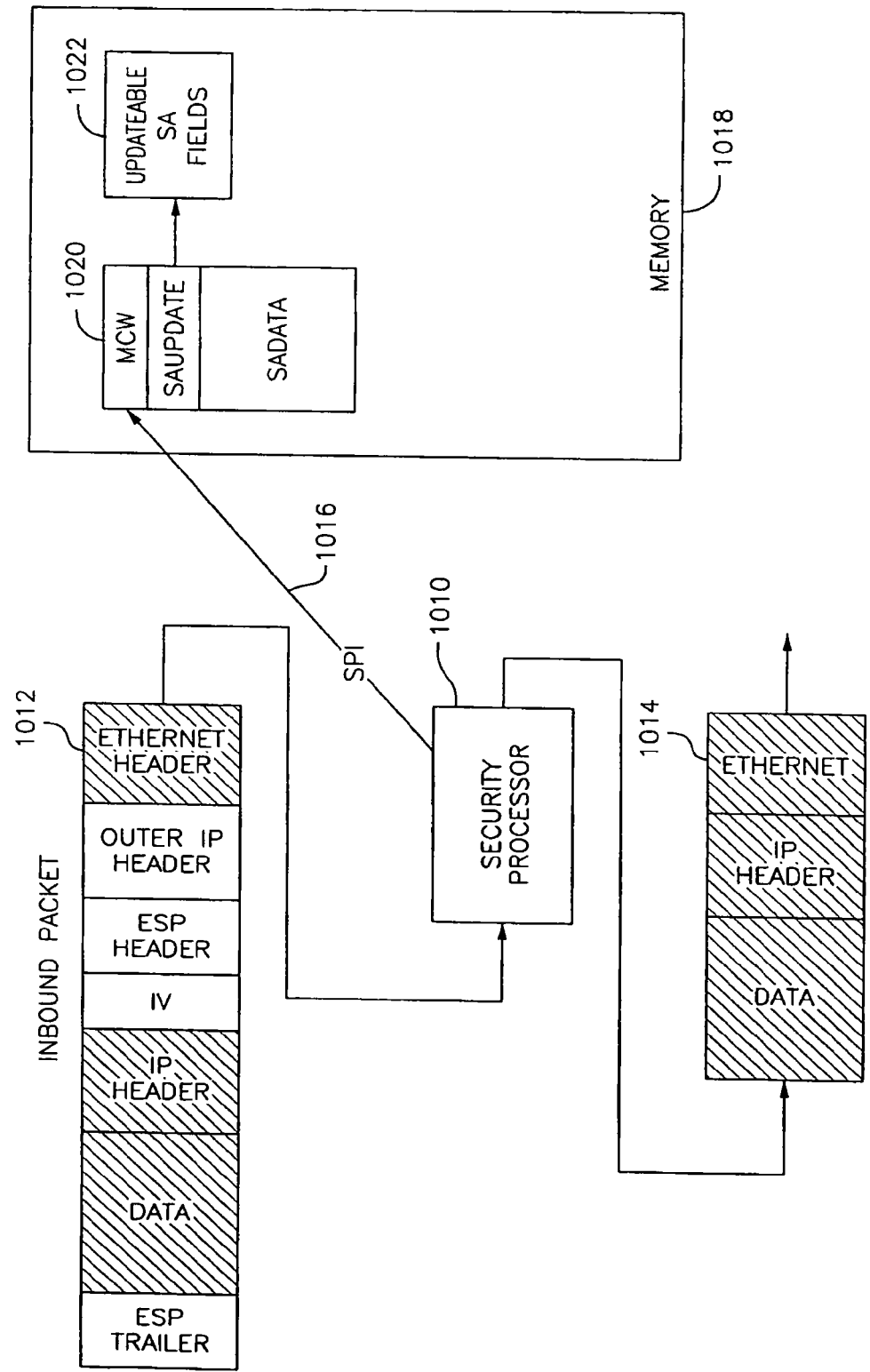
FIG. 10 is a block diagram representative of one embodiment of inbound processing flow in accordance with the invention.
Figure 11:
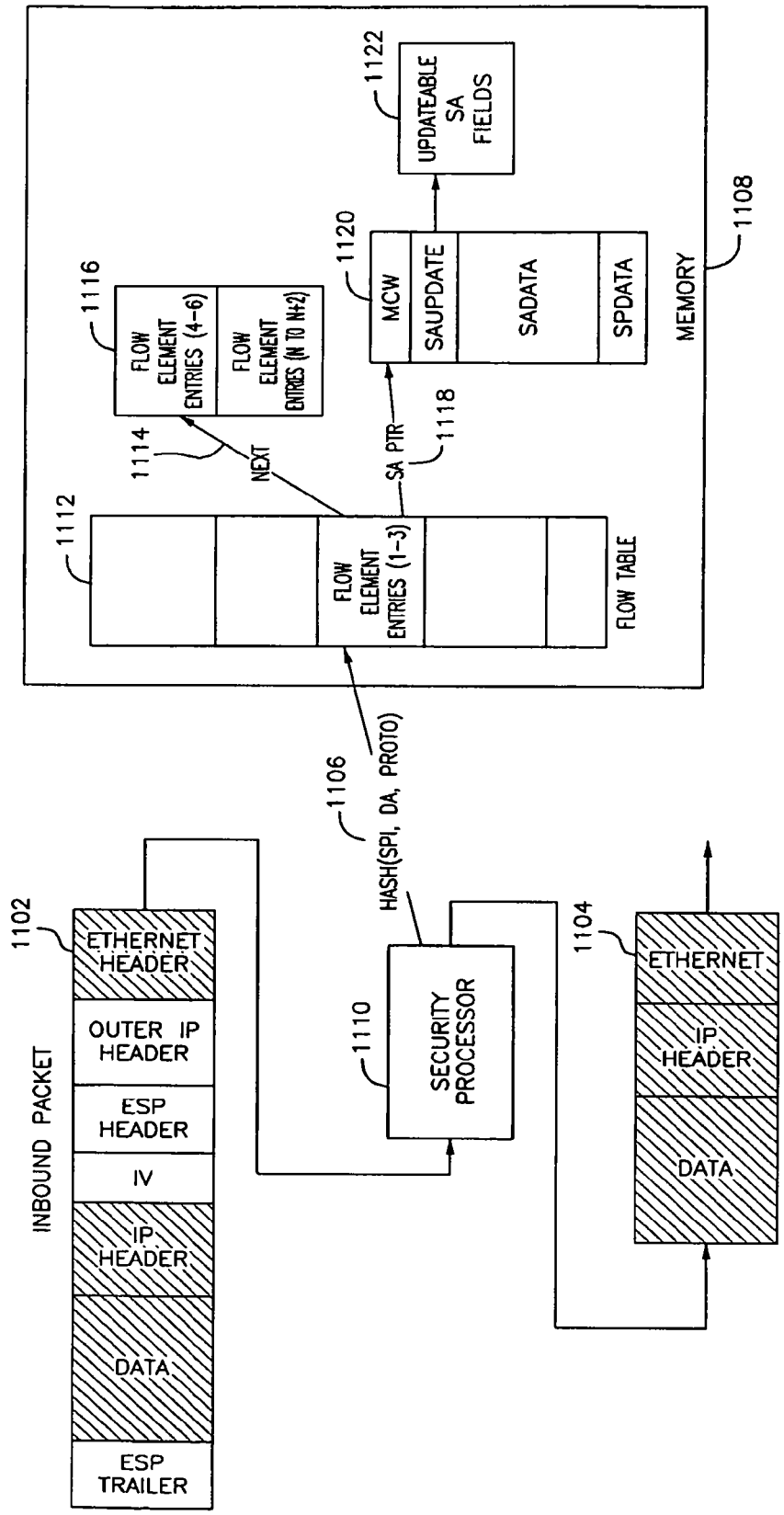
FIG. 11 is a block diagram representative of one embodiment of inbound processing flow in accordance with the invention.
Figure 12:
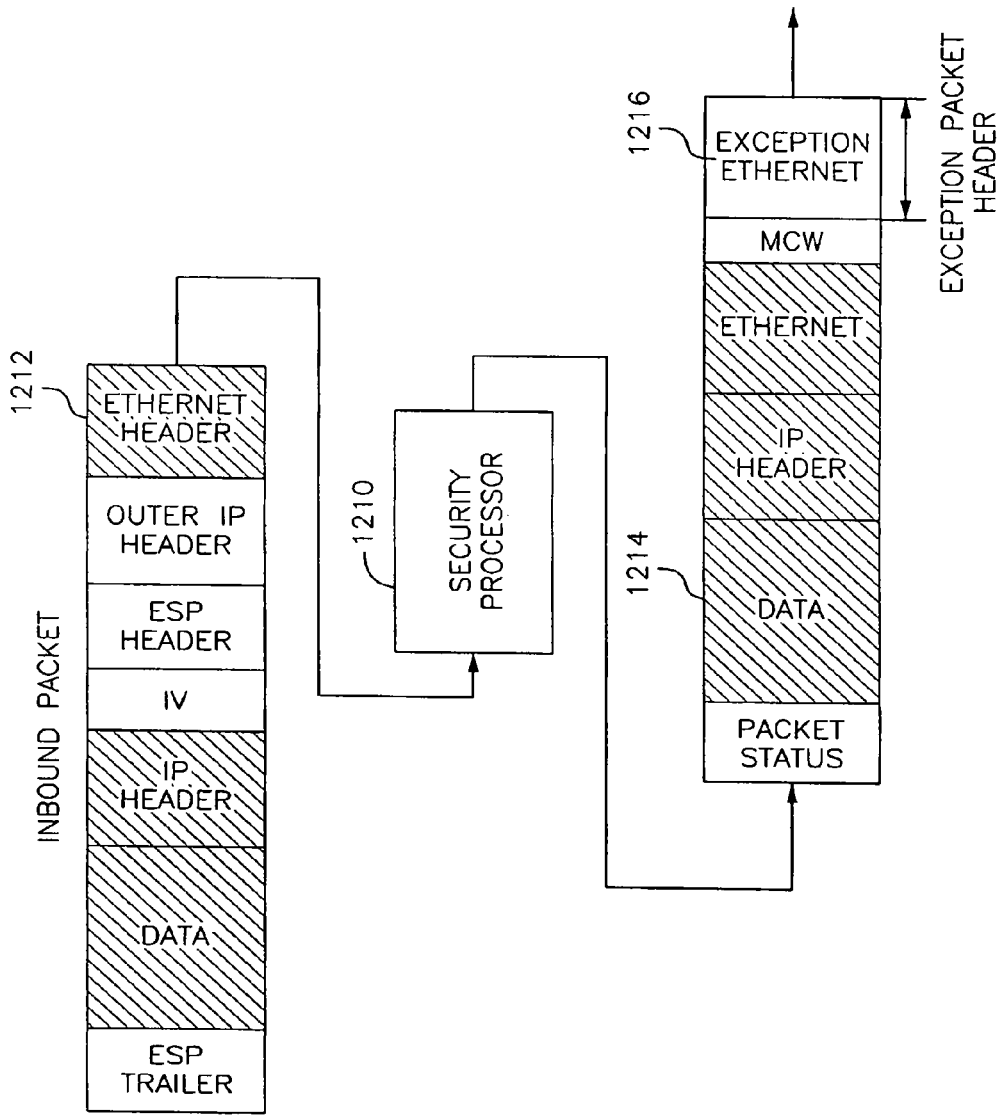
FIG. 12 is a flowchart representative of one embodiment of exception processing operations that may be performed in accordance with the invention.

Referring now to FIGS. 6-12, the operations of one embodiment of a security system constructed according to the invention will be treated in more detail. FIG. 6 describes configuration operations. FIGS. 7 and 8 describe operations for outbound packets. FIGS. 9, 10 and 11 describe operations for inbound packets. FIG. 12 describes operations for exception packets.

FIG. 6 describes a few selected operations that may be performed after the system is reset. Blocks 600-612 describe several operations of a security processor. Blocks 614-632 describe several operations of a host processor.

When the security processor is reset as represented by block 600, the security processor sets all host-side interfaces to return data back on the same channel from which it was received and sets all line side interfaces to block all traffic. This may be accomplished by setting an appropriate default value for the MCW. In addition, input signals may be used to set each GMAC to a host side or a line side configuration.

After the security processor exits reset, the security processor may default to a low power mode (block 602) depending on the state of a LOW_PWR# input signal. In low power mode the entire IPsec data path, the public key data path and external memory are disabled. For example, they may be placed in the low power state by gating their clock. Thus, only packets targeted at the bypass data path are allowed during this state.

In one embodiment, the security processor is initialized (block 604) using a side band MDIO interface to control the integrated SERDES core and to initialize internal registers. In this embodiment, the MDIO interface: 1) configures the SERDES to the proper line speed; 2) releases the security processor from the low power state, hence it enables the IPsec data path; 3) sets MAC speed (10/100/1000); 4) sets the host side MAC to the promiscuous state; and 5) set the line side MAC to the promiscuous state (block 606).

The rest of the configuration for the security processor may be initialized through the Ethernet controller by the host processor using configuration packets.

After a reset for a WakeOnLan mode of the secure NIC, the security processor is not released from the low power state. Instead, an MDC/MDIO interface is used to set up a pass through from the host side ports to the line side ports. This may be accomplished by programming an appropriate value for the default MCW and by releasing the block state on the line side port.

The security processor accepts configuration accesses through any host side interface (block 608). The host configuration packets are extracted from the Ethernet data packets. One embodiment of an extraction process is described below. The extracted packet may contain the return Ethernet address (set by the host) for the processed configuration access packet.

One embodiment of the invention supports four types of configuration packets: 1) register access packets (RAP); 2) memory access packets (MAP); 3) MODEXP access packets (MEP); and 4) flow update access packets (FAP).

The host may use memory access packets to manage the layout and format information stored in the local memory of the security processor. The security processor executes each of the memory accesses coherently and in correct order with data packets. The host may use a HostContext field in the configuration packets to add sequence numbers, processing tags, etc. to the packet.

The local memory also stores security association information sent by the host processor (block 610). One embodiment of a security processor stores some of the security associations internally and, if necessary, stores additional security associations in an external memory such as a dual data rate SDRAM ("DDR-SDRAM"). The DDR-SDRAM configuration may be set by the host via a configuration access packet and stored in local EEPROM.

After the security processor is configured it processes packet traffic as discussed herein (block 612).

After the host processor is reset as represented by block 614, the host processor configures the security operations of the system (block 616). As represented by dashed line 618, this includes some of the operations discussed in conjunction with block 608.

The host processor also cooperates with an Ethernet controller to set up communication paths (block 620) and TCP sessions (block 622) with other host processors through the security processor's connections to the Ethernet network.

In the case of secure sessions (block 624), the host processor generates unique security associations for each secure session (block 626). The host processor then sends the security associations to the security processor (block 628). As represented by dashed line 630, this includes some of the operations discussed in conjunction with block 610.

After the host processor completes these initialization steps it processes packet traffic as discussed herein (block 632).

FIG. 7 describes a few selected operations that may be performed to process outbound packets. Blocks 716-730 describe several operations of a security processor 810 (FIG. 8). Blocks 700-714 describe several operations of an Ethernet controller. In the described embodiment the Ethernet controller includes TCP offload capability as discussed herein. For embodiments where the bulk of the TCP/IP processing is performed by the host processor, the host processor may perform the operations represented by blocks 704-714.

After the outbound operation begins as represented by block 700, the Ethernet controller receives data from the host processor (block 702).

As represented by block 704, the Ethernet controller performs TCP/IP processing as discussed herein to packetize the data from the host. As this process typically involves building the packet, the Ethernet controller has ready access to the IP header information such as the source address, the destination address and the protocol. In addition, the Ethernet controller has ready access to the TCP header information such as the source port and destination port. In some embodiments the Ethernet controller stores this information for each session in a context memory. This information may be used to uniquely define a flow in IPsec. Hence, this information may be used to identify the security associations associated with a given secure session (block 706). Thus, the Ethernet controller may identify flow identifier information (e.g., a security association address, etc.) for the secure session (block 708).

IPsec may assign one flow to multiple TCP connections that have the same IP flow (IP source and destination addresses) in common. Hence, a given set of flow identifier information may be used for multiple TCP connections.

As represented by blocks 710 and 712 the Ethernet controller generates a security identifier header for the TCP/IP packet and encapsulates the TCP/IP packet and the flow identifier information with the security identifier header. This operation may encompass the procedures discussed above in conjunction with FIG. 3.

In another embodiment, the Ethernet controller may add templates for the IPsec header and trailer to the packet. The security processor then performs the necessary IPsec operations. In this way, some of the header and trailer processing operations may be offloaded from the security processor.

The Ethernet controller then sends the packet to the security processor as represented by block 714. FIG. 8 depicts one embodiment of an outbound packet 812. Starting from the right side of the packet, the packet 812 includes the Ethernet security identifier header, a CLASS-0 identifier (discussed below), and the original TCP/IP packet (Ethernet header, IP header and data).

Turning now to the operations of the security processor 810, the security processor 810 handles four types of packets from the host side interface: 1) configuration access packets (Class-FAMILY, CHIP); 2) outbound IPsec packets (CLASS-0); 3) outbound IP packets (DEFAULT_MCW); and 4) outbound non-IP packets (DEFAULT_MCW set MCW.NOP). The FAMILY, CHIP classification may be used to denote a particular family of chips for a manufacturer and a specific chip within that family. For example, a family of chips could define a manufacturer's security products.

When the security processor 810 receives the packet 812 (block 716), the security processor 810 searches the Ethernet type field in the security identifier header to determine the type of packet as listed above. Any non-IPsec or non-IP packets are passed through the security processor 810 essentially without modification. The security processor 810 may recalculate the Ethernet CRC.

If the security processor 810 determines that it should process the packet (block 718) the security processor 810 strips the security identifier header (block 720).

Next, the security processor 810 attempts to retrieve the flow identifier information (block 722). All packets in the CLASS-0 format will have the flow identifier in the packet.

As represented by line 818, the security processor 810 uses the flow identifier information to construct a direct address security association handle. The lower 22 bits of the FlowID refer to the location of the security association in memory (e.g., local memory 816). The upper two bits 822 of the 24-bit flow ID may be used to store the length of the security association. FIG. 8 depicts one embodiment of a security association 820.

The security processor 810 uses a default MCW for any packets that do not have a defined type. The host may set bits in the MCW to indicate that the packet should be dropped (MCW.DropPacket) or that the packet should be passed through (MCW.NOP). The security processor 810 processes any CLASS-FAMILY=security packets as configuration packets.

The security processor 810 may be configured to drop any packets that do not contain a valid flow identifier (range check on the direct addresses). A deleted security association location must contain an MCW with the MCW.DropPacket bit set (an MCW of all zeros may be used to indicate a deleted security association that forces an exception packet). Any traffic that is intended to pass through the security processor 810 may be placed on a flow that indicates NOP in the MCW (bypasses IPsec processing). All other traffic is dropped (or returned as an error) by the security processor 810.

An inner Ethernet header that does not contain an IP packet may either be passed or dropped by the security processor 810.

In the configuration shown in FIG. 8, the host has already performed the security association lookup. The direct address of the security association is passed in the CLASS-0 tag as the flow identifier. The result is a fixed latency through the security processor 810 as the security processor 810 does not need to do the flow lookup for any outbound packets. Moreover, this fixed latency may be obtained without the use of relatively expensive content addressable memory or cache memory that might otherwise be used to identify or store the security association for a given flow.

As represented by blocks 724, 726 and 728, the security processor 810 retrieves the security association data from memory, encrypts/authenticates the packet (e.g., packet 814) and assembles the IPsec packet. The resulting processed packet 814 contains the inner Ethernet header ready for transmission (modified by the security processor 810 to contain the proper length for transmission on IP packets). As shown in FIG. 8, the packet 814 includes, from right to left, the inner Ethernet header, the outer IP header and IPsec information (ESP header, Initial Vector), the encrypted/authenticated IP header and data, and the IPsec ESP trailer.

The security processor then transmits the packet 814 over the Ethernet network (block 730).

In some applications, a previously encapsulated packet may be sent to the security processor 810 using the CLASS-FAMILY=security packet type. This packet will be encrypted/authenticated by the security processor 810 using the security association data ("SAData") stored either in local memory or passed in-band with the packet. This format is required for some Microsoft applications. A SAData.Cap_En bit may be set to zero to prevent the security processor 810 from attempting encapsulation for these types of packets.

FIG. 9 describes a few selected operations that may be performed to process inbound packets. Blocks 900-914 describe several operations of a security processor 1010 (FIG. 10). Blocks 916-920 describe several operations of an Ethernet controller.

As represented by block 902, the security processor 1010 receives inbound packets 1012 (FIG. 10) from the Ethernet network. Any packets that enter the security processor 1010 from the LINE side interface are tagged with a DEFAULT_MCW that indicates an "inbound" packet. The security processor 1010 may be configured to bypass inbound non-IPsec traffic (no lookup done on the packet). The inbound non-IPsec traffic may be forwarded to the host without modification. Any non-IP traffic also may be passed through to the host without modification. Configuration packets are not allowed on a line side interface.

For inbound IPsec traffic where a SPI value can be controlled (block 904), the SPI may be used directly by the security processor 1010 to find the security association data as represented by line 1016 in FIG. 10. For example, the SPI may contain the address of the security association data 1020 in a memory 1018. The security processor performs a range check on all direct addresses to ensure that they are within the range of the established security association memory. Any direct access that is "out of range" is considered a flow not-found.

At block 906 the security processor 1010 checks the flow to determine whether the flow is within the range assigned to the security processor 1010. The security processor 1110 may be configured to bypass any packets for which a flow is not found. This allows the host to terminate IPsec for the packet. The security processor 1010 may be configured to either bypass inbound flow miss packets (typical for a secure NIC, "SNIC," configuration) or flag them as errors (returned on the exception path).

If IPsec processing behind the SNIC is required (e.g., the SNIC is not offloading all of the possible sessions), the security processor allows data to pass through the device to the host. In general, the security processor may be configured to allow any inbound IPsec packet that is not found in the flow (or security association, SPI) lookup to be passed through to the host without any errors.

If at block 906 the flow is within the range assigned to the security processor 1010, the security processor 1010 unencapsulates the IPsec packet (block 908), retrieves the security association (block 910) and decrypts/authenticates the encrypted/authenticated IP header and data (block 912). As depicted in FIG. 10, an SAUpdate field in the security association data 1020 may be used to point to updateable security association fields 1022. The security processor 1010 sends the reassembled packet 1014 to the Ethernet controller (block 914).

After the Ethernet controller receives the packet (block 916), the Ethernet controller unencapsulates the packet (block 918) and sends the data to the host processor (block 920).

FIG. 11 depicts one example of IPsec traffic flow for an embodiment that accounts for the situation where the SPI value cannot be controlled in some of the incoming packets. In this case, the security processor 1110 retrieves the SPI, destination address ("DA") and protocol ("PROTO") fields of the packet and, as represented by lines 1106 and 1114, performs a hash algorithm into the inbound flow table 1112 and 1116 to find the security association 1120 in the memory 1108. In one embodiment, the security processor 1110 performs an exact match search to verify that it has found the proper security association.

A decrypted packet may be returned by the security processor 1110 without removing the decapsulate (as required for some implementations) if SAData.Cap_En=0.

Referring to FIG. 12, the security processor 1210 may return exception packets over the GMAC host side interface. Any exception packets (inbound or outbound) 1212 are returned to the exception path (set to the GMAC host side interface for a SNIC configuration). The security processor 1210 adds a programmable header 1216 to the error packet 1214. For example, this may be an Ethernet header with a tag set in the TYPE field to the return host. If the added header is Ethernet, the security processor 1210 calculates the proper Ethernet length field.

In one embodiment, the security processor 1210 returns error packets with only one type of header. In this case, the host may have to parse the MCW and PacketStatus fields that may be in the packet.

Figure 13:
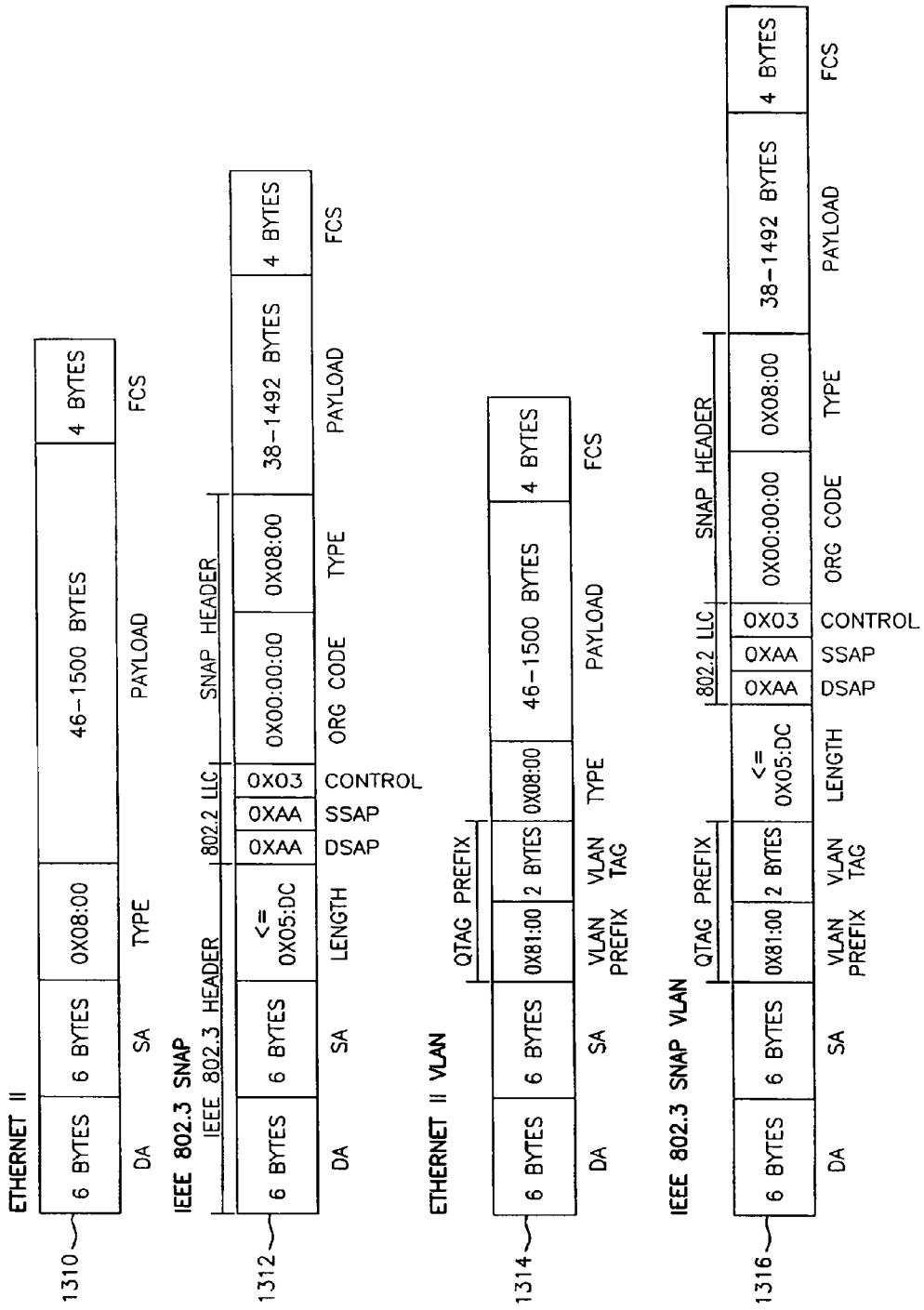
FIG. 13 is a block diagram representative of Ethernet frame formats.

With the above description in mind, one embodiment of Ethernet header processing will now be discussed in conjunction with FIGS. 13-17. Referring initially to FIG. 13, if the IP header is framed by an Ethernet MAC header then the security processor will calculate the offset to the IP header. There are four supported Ethernet types, each with a different offset to the IP header:

1) Ethernet II (IEEE 802.3) (1310 in FIG. 13);
2) Ethernet SNAP (IEEE 802.3, RFC 1042) (1312 in FIG. 13);
3) Ethernet II VLAN (IEEE 802.3, IEEE 802.3ac) (1314 in FIG. 13); and
4) Ethernet SNAP VLAN (IEEE 802.3, IEEE 802.3ac) (1316 in FIG. 13).

Figure 14:
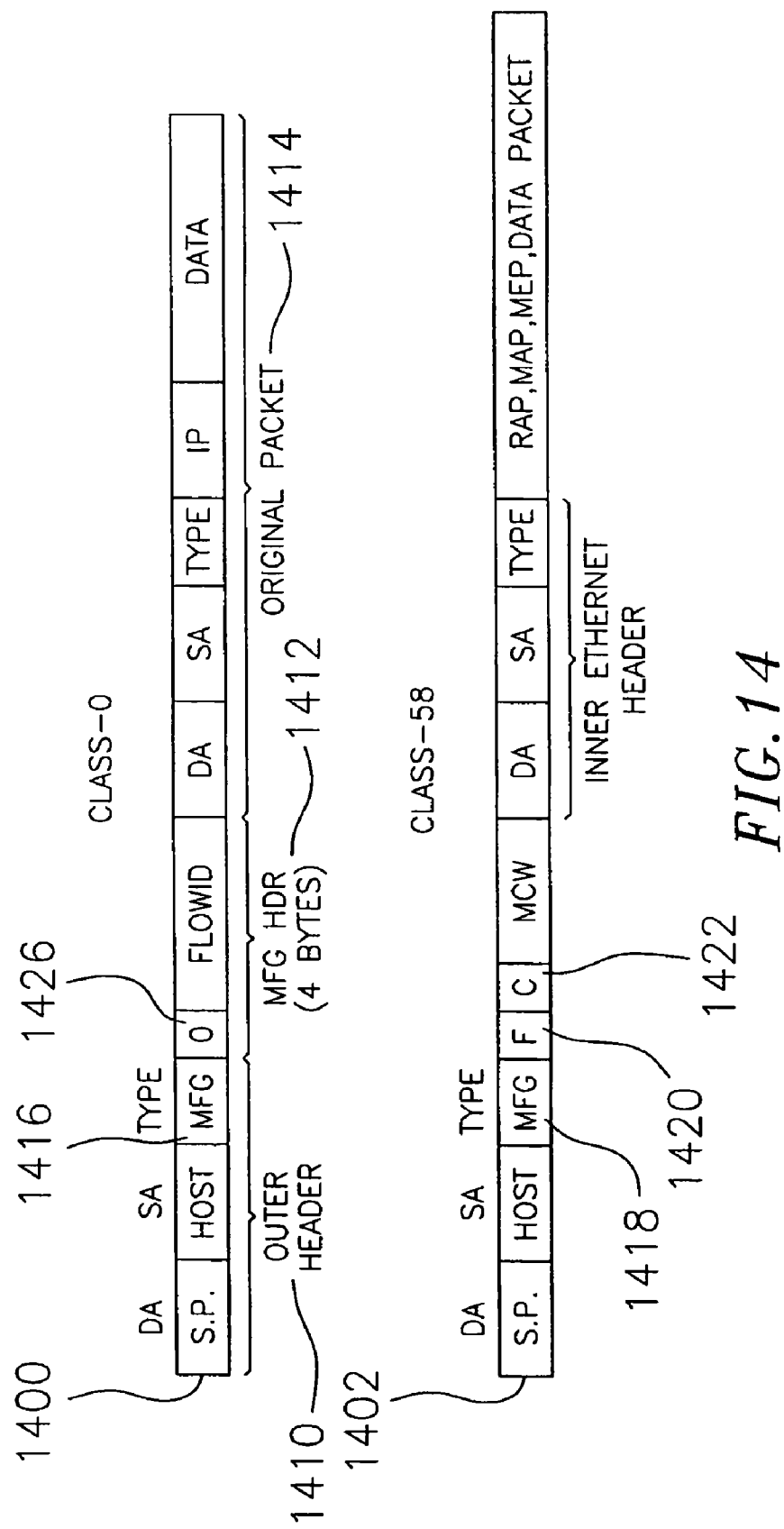
FIG. 14 is a block diagram representative of one embodiment of Ethernet frames with headers in accordance with the invention.

Referring now to FIG. 14, two types of packets 1400 and 1402 are shown. The DA fields contain a destination address. The SA fields contain a source address. S.P. represents an address of a security processor.

The security processor processes the Ethernet header (e.g., outer header 1410) to extract in-band communication over a host side interface. The packet is identified using the Ethernet "TYPE" 1416 field of the Ethernet header. A company may have a unique registered Ethernet "TYPE" 1416 that defines the in-band packet communication. This "TYPE" is registered with the IEEE. This mechanism may be used for any of the supported Ethernet formats.

The security processor recognizes two formats of this custom in-band communication scheme. The first format (CLASS-0) is intended for all devices of a company where a flow tag has been used to identify the unique "flow" for a packet. One embodiment of such a packet is the top packet 1400 of FIG. 14. The first byte 1426 of the MFG_HDR 1412 is always zero to indicate that the MFG_HDR 1412 is four bytes and contains a 3-byte flow identifier ("FlowID").

The second format (CLASS-F for FAMILY) is used on a per chip basis for configuration access that is defined by the device. One embodiment of such a packet is the lower-packet 1402 of FIG. 14. If the first byte 1420 is non-zero, the information that follows (i.e., block 1422) is ignored by all devices except the assigned class. For example, all security devices made by a manufacturer may use a prefix of 0x58 as the first byte 1420 to indicate the security processor class. The next byte 1422 is defined as the subclass or device family ID. A value of 0x45 may be used for the security processor. This two-byte code automatically aligns the next word of the configuration packet (the MCW) to a 32-bit boundary.

Figure 15:
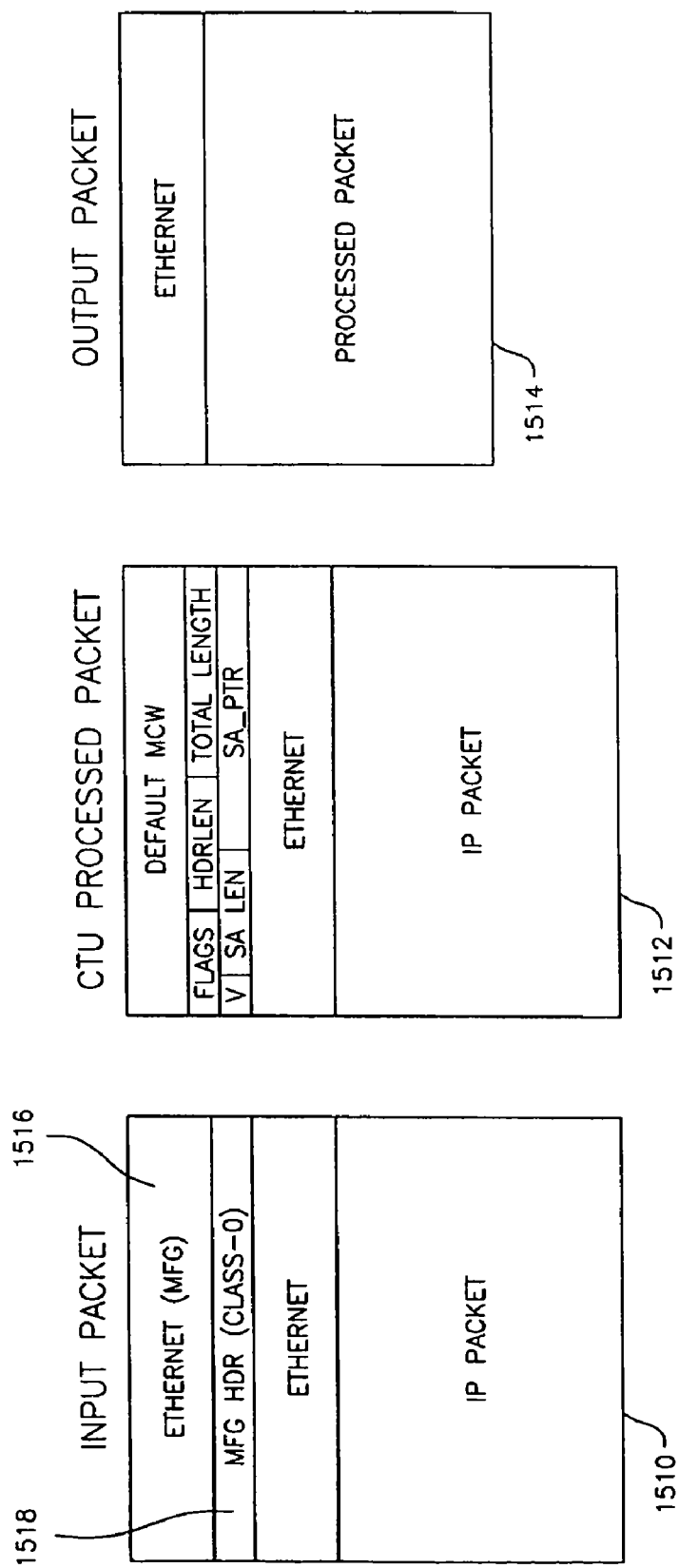
FIG. 15 is a block diagram representative of one embodiment of IPsec packet processing in accordance with the invention.

Referring to the CLASS-0 case of FIG. 15, the security processor strips off the outer Ethernet header 1516 containing the manufacturer ("MFG") Ethernet type 1518 from an input packet 1510. When the security processor finds a CLASS-0 MFG_HDR 1518 the security processor adds a CLASS0_MCW value and uses the FlowID as the security association pointer ("SA_PTR") along with a default security association length ("SA_LEN") to construct a "direct" security association handle ("SAHandle") field for the packet 1512 shown in FIG. 15. The upper two bits of FlowID are used to select up to four different default lengths. The SAData Structure should be one of four default lengths for all security associations when using this mode. Typically there would be one length for transport packets and another for tunnel packets. After IPsec processing, the security processor outputs a packet 1514.

Figure 16:
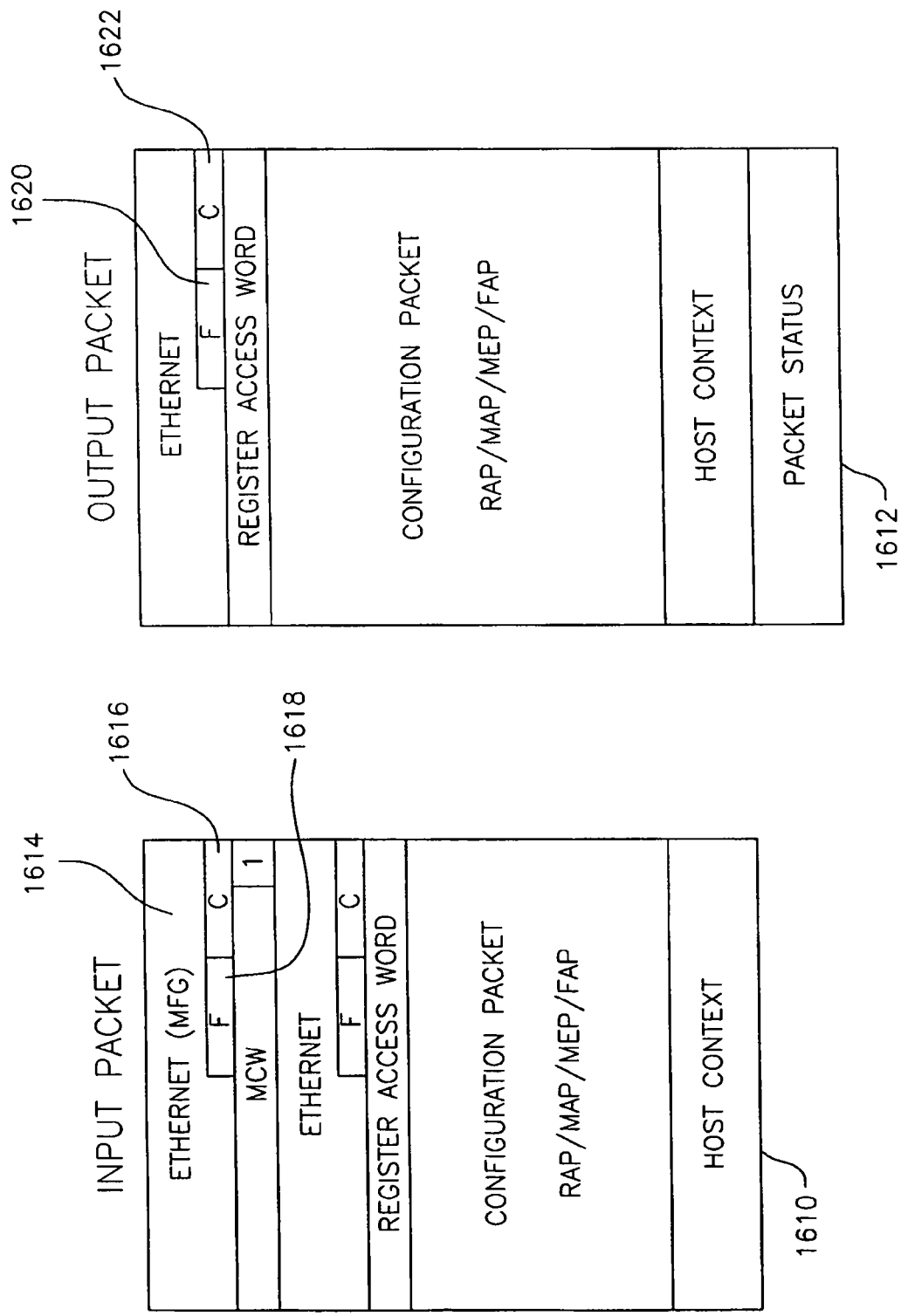
FIG. 16 is a block diagram representative of one embodiment of configuration packet processing in accordance with the invention.

Referring to the CLASS-F case of FIG. 16, the processing for a CLASS-F-C MFG_HDR involves processing class ("F") and sub-class ("C") for the current chip as discussed above. The security processor discards the original header 1614 and the two bytes of CLASS/SUB-CLASS 1618, 1616 of the input packet 1610. This results in a 32 bit aligned MCW that is processed by the security processor. The configuration packet 1612 is returned to the host via the second Ethernet header, which should be properly formatted by the host.

The security processor also may allow an Ethernet header to be embedded in the configuration packet depicted in FIG. 16. When the Ethernet header is embedded in a non-data packet type, the four-byte 0xF-C code is used to align a RegisterAccessWord to a 32-bit boundary (already aligned on input). The security processor does not change this Ethernet header prior to being sent. Therefore, the host should predict the size of the resulting packet with the proper Ethernet length.

Figure 17:
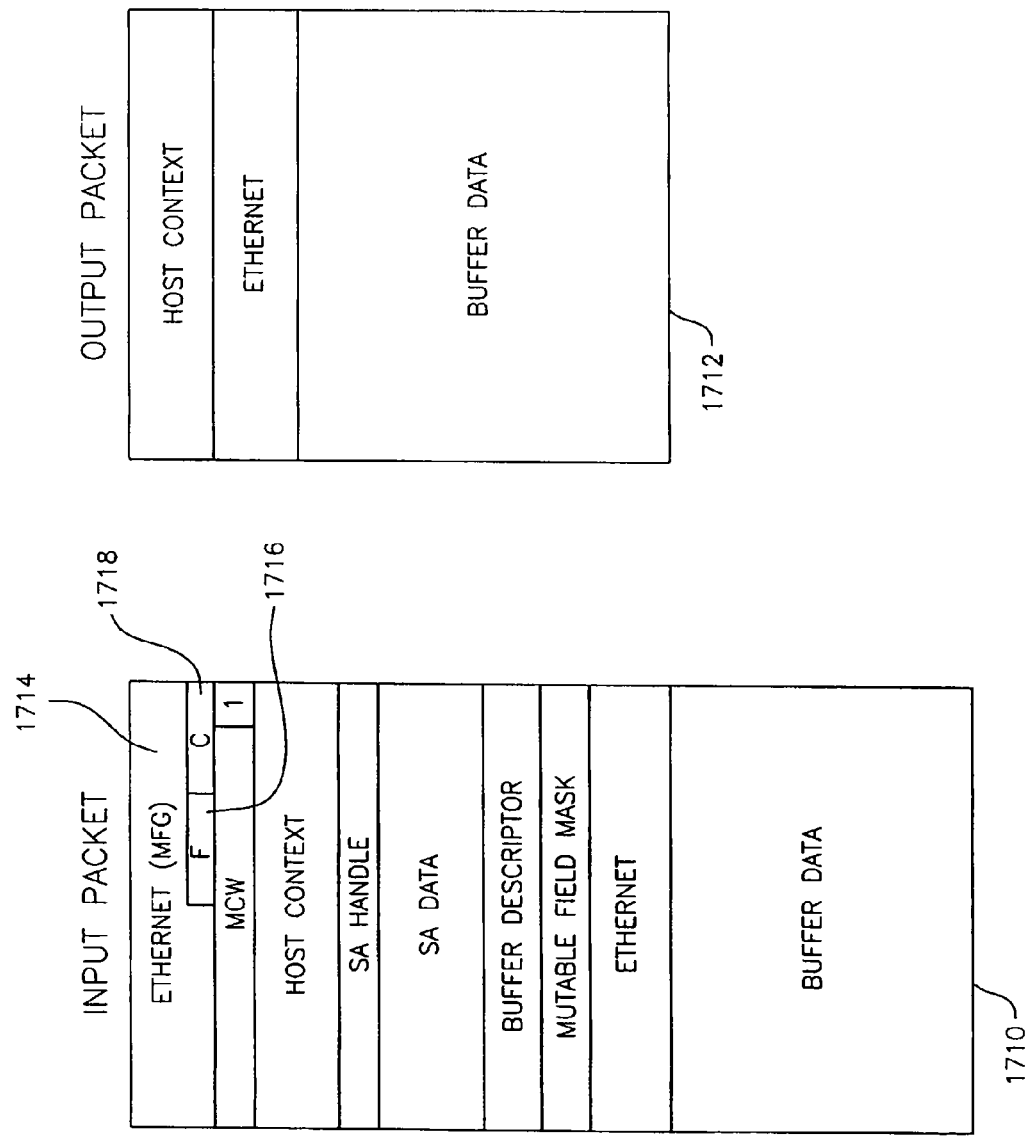
FIG. 17 is a block diagram representative of one embodiment of data packet processing in accordance with the invention.

Referring to FIG. 17, the security processor CLASS-F packet type may be used to send a regular packet with a host constructed MCW that matches the packet formats. In this case, the Ethernet header is handled normally. The security processor recalculates the Ethernet header length and adds/removes the gap between the Ethernet header and the IP header to generate the output packet 1712.

The above discussion illustrates one example of how the invention may be implemented. It should be understood, however, that the invention may be practiced using other packet processing techniques. For example, information similar to that described above may be inserted into conventional headers. In addition, the system could be configured to not add the special header yet always assume that the header is present. In this case, the system could add a simple tag to the header (even in front of the header). Furthermore, the outer header could be omitted and the security processor configured to assume that all packets received from a given source will be in bytes. In addition, the security processor could be configured to add the inner Ethernet header.

Also, different implementations may be used to locate the security association information. For example, rather than using the FlowID, a hashing algorithm may be used on the source address, destination address, protocol, source-port and destination port. The FlowID may be calculated by other components in the system. The FlowID may include other information related to the security association other than a direct address.

Figure 18:
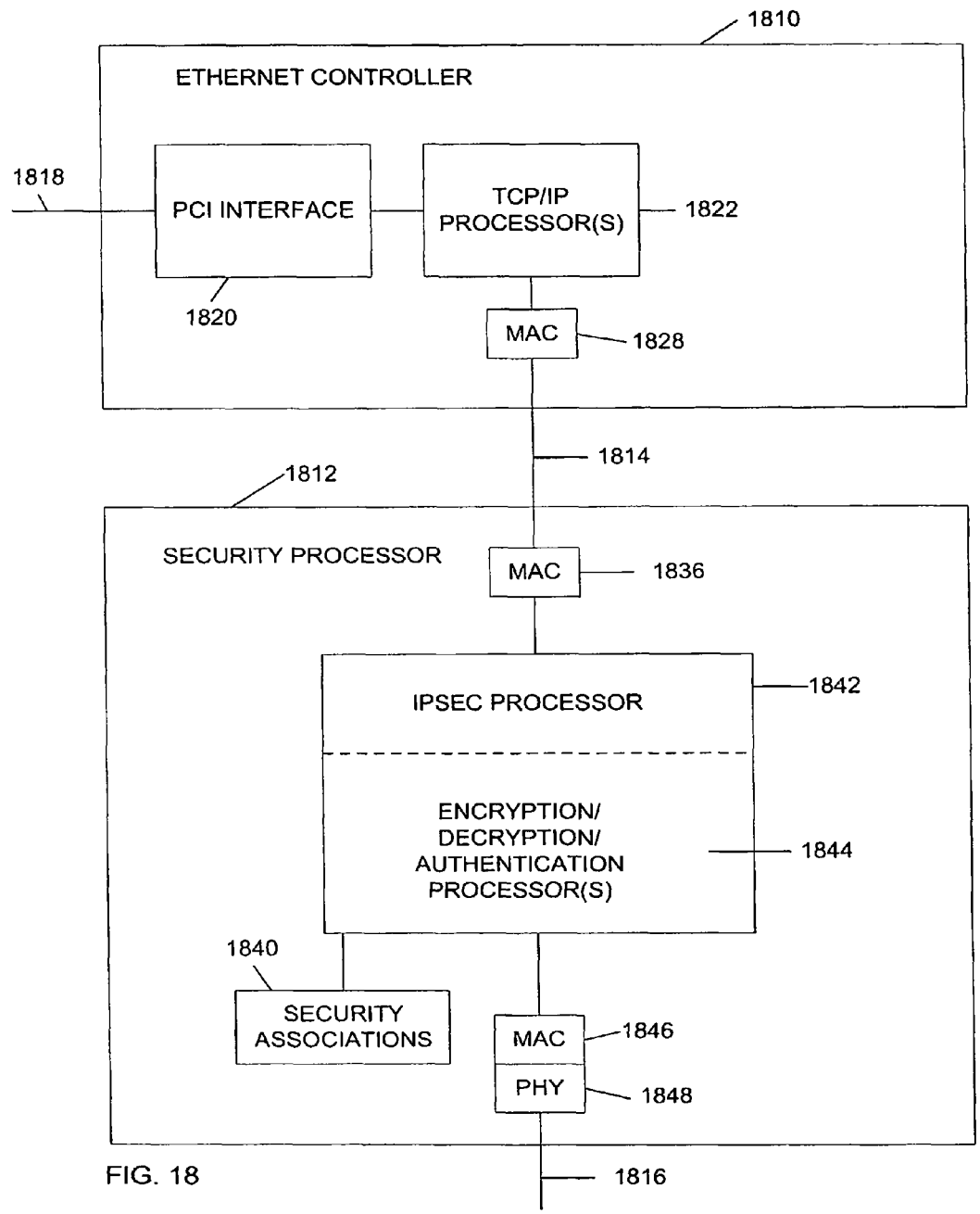
FIG. 18 is a block diagram of one embodiment of a network interface system constructed in accordance with the invention.
Figure 19:
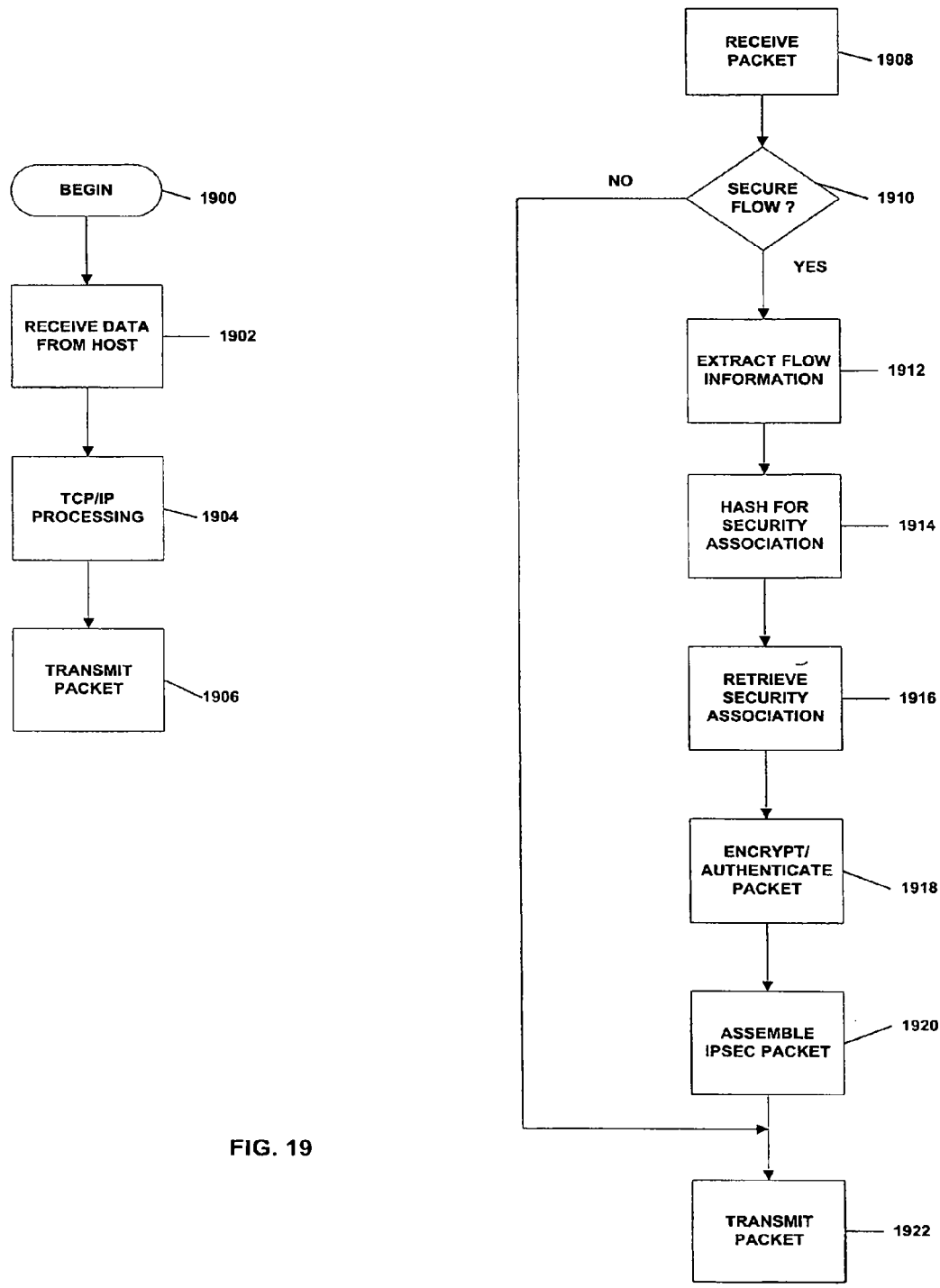
FIG. 19 is a flowchart representative of one embodiment of outbound processing operations that may be performed in accordance with the embodiment of FIG. 18.
Figure 20:
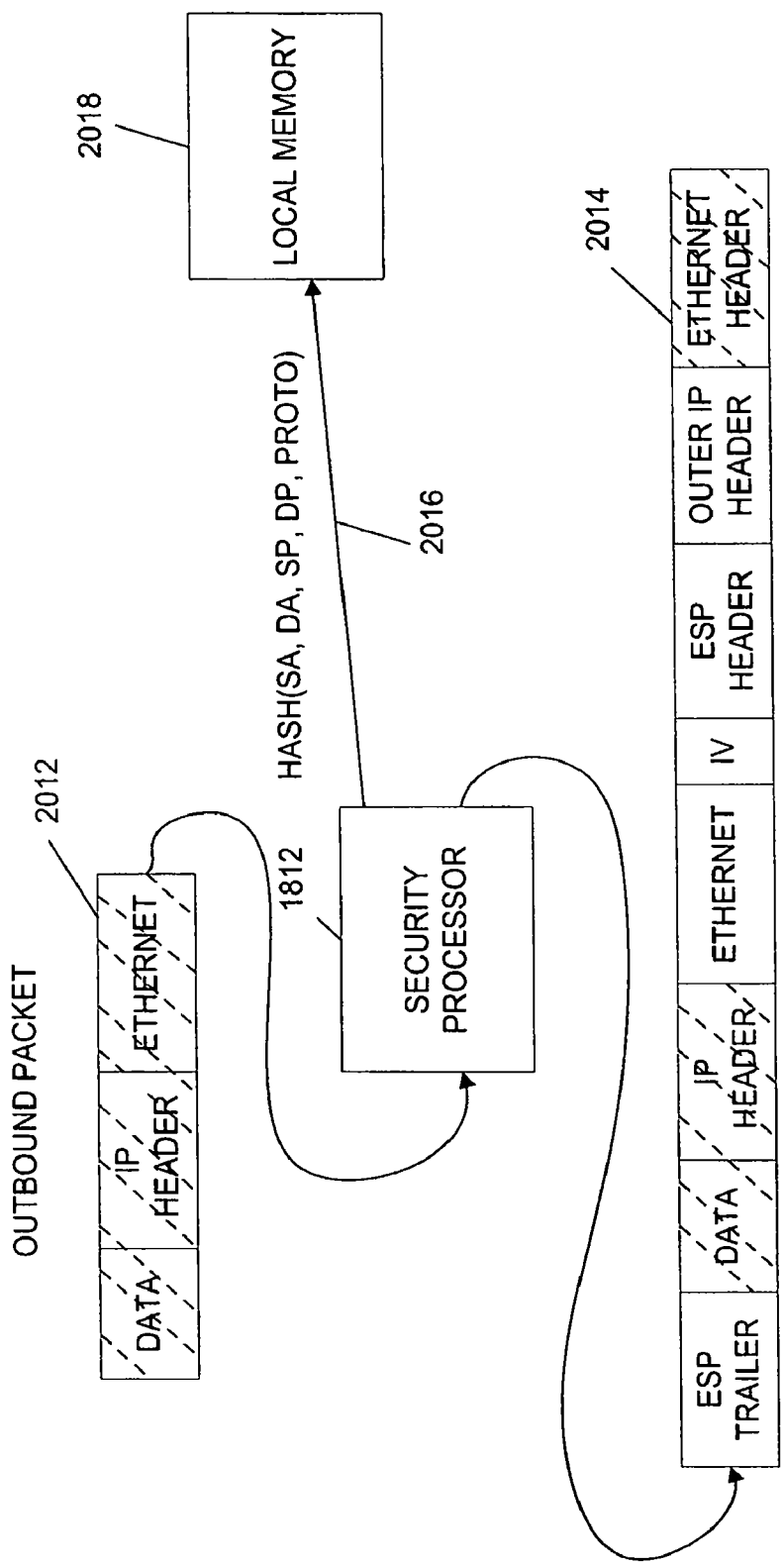
FIG. 20 is a block diagram representative of one embodiment of outbound processing flow in accordance with the embodiment of FIG. 18.

Referring now to FIGS. 18-20, one of these alternate embodiments will be discussed in more detail. In this embodiment a security processor 1812 operates in an essentially transparent manner with respect to an Ethernet controller 1810. For example, the Ethernet controller 1810 does not provide a security identifier header to the security processor 1812 as discussed above. Rather, the security processor may independently locate security association for a secure flow by a direct lookup or hashing flow information from the packets.

The Ethernet controller 1810 includes standard controller components for interfacing with the busses as discussed in previous embodiments. For example, a PCI interface 1820 provides connectivity to the PCI bus 1818 and a MAC 1828 provides connectivity to an Ethernet network 1814. These or similar components may be selected to support various data bus and network standards and associated data rates.

In addition, the Ethernet controller 1810 may include components for offloading TCP operations from the host processor (not shown). For example, the Ethernet controller 1810 may include a TCP/IP processor 1822 that performs, for example, various TOE operations, packet assembly for outbound packets and packet disassembly for inbound packets.

The Ethernet controller 1810 also may perform operations to account for packet overhead (e.g., added packet headers) that may be associated with the cryptography operations. For example, the Ethernet controller 1810 may support an updated path maximum transmitted unit ("MTU") size that takes into account the size of the IPsec header and trailer added by the security processor 1812. In this case, the Ethernet controller 1810 may reduce the TCP/IP payload size accordingly. This may prevent creating IP fragments.

The security processor 1812 includes several components that perform cryptographic operations such as IPsec. For example, an IPsec processor 1842 processes packets associated with secure sessions. In some embodiments, the IPsec processor 1842 incorporates one or more encryption/decryption/authentication processors 1844 that encrypt/decrypt/authenticate packets received over the networks 1814 and 1816. Security associations 1840 used in the encryption/decryption/authentication operations are stored in internal and/or external data memory (not shown).

The security processor 1812 also may include MAC interfaces 1836 and 1846 for connecting the security processor 1812 to the Ethernet networks 1814 and 1816, respectively. In one embodiment the MAC interfaces 1836 and 1846 comprise 10/100/1000 Gigabit media access controllers ("GMACs") that are used in conjunction with integrated serializer/deserializers ("SERDES").

In one embodiment, the security processor 1812 interfaces with the network 1816 via an integrated network PHY 1848. In addition, PHY interfaces (not shown) may be associated with the MACs 1828 and 1836 depending on the physical characteristics of the connection 1814. For example, if the Ethernet controller 1810 and the security processor 1812 are located on a common circuit board they may be connected without a full implementation of an Ethernet PHY. If the Ethernet controller 1810 and the security processor 1812 are located remotely from one another via an Ethernet network, a full implementation of an Ethernet PHY may be used.

The PHY interfaces may or may not be incorporated into the same integrated circuit as the MACs. For example, as represented by FIG. 18 the PHY 1848 may be incorporated into an integrated circuit for the security processor 1812 that includes the MAC 1846. In other embodiments, the PHYs (e.g., PHY 1848) may be implemented in a separate integrated circuit.

Further to the above, the components of FIG. 18 may be implemented in various configurations. The components of the Ethernet controller 1810 and/or the security processor 1812 may be implemented, for example, in hardware and/or as software code executing on one or more processors. Some or all of these components may be implemented on one or more integrated circuits and/or on common or separate circuit boards such as NIC and LAN-on-Motherboard solutions.

Referring now to FIGS. 19 and 20, a brief description of data flow through the system of FIG. 18 for a secure session follows. Several operations of the Ethernet controller 1810 are represented in FIG. 19 by blocks 1902-1906. Several operations of the security processor 1812 are represented by blocks 1908-1922. FIG. 20 illustrates one embodiment of processing flow for the system of FIG. 18.

Beginning at block 1900 in FIG. 19, the host sends application data to the Ethernet controller 1810 via the PCI bus 1818 (block 1902). As represented by block 1904, if the Ethernet controller 1810 supports TOE operations it may perform some of the TCP processing for the host. In addition, the Ethernet controller 1810 encapsulates the data to form TCP/IP packets that may be sent over an Ethernet network. As represented by block 1906, the Ethernet controller 1810 then sends the outbound packets to the security processor 1812 via connections 1814.

FIG. 20 depicts one embodiment of an outbound TCP/IP packet. Starting from the right side of TCP/IP packet 2012, the packet 2012 includes an Ethernet header, an IP header and data.

After the security processor 1812 receives the packets (block 1908), it may extract information from the packets to determine whether the packets are associated with a secure flow (block 1910). If the packets are not associated with a secure flow, the security processor 1812 forwards the packets to the network as represented by block 1922.

If the packets are associated with a secure flow, as represented by block 1912, the security processor 1812 may extract flow information from the packets to locate security association information for the packet. The flow information may include, for example, source address, destination address, protocol, source port and destination port information for the packets.

As represented by block 1914 and by line 2016 in FIG. 20, in some embodiments the security processor 1812 may hash this flow information to, for example, generate an index into a table that contains addresses of security association information stored in a data memory (e.g., local memory 2018). Once the address of the security association is determined, the security processor 1812 retrieves the security association information from the data memory 2018 (block 1916).

In an alternative embodiment, the security processor 1812 may locate a security association using a SPI from a received packet as discussed above. In some embodiments the SPI is compared against stored SPI values to access the security association information. In this case, the security processor 1812 may perform a direct lookup into the data memory 2018.

The security processor 1812 may then perform cryptography (e.g., IPsec) operations on the packets. As represented by block 1918, these operations may include encrypting/authenticating outbound packets and, as represented by block 1920, encapsulating the encrypted/authenticated packets into IPsec packets by, for example, adding an IPsec header and trailer. These operations also may include updating the IP protocol field to point to the appropriate IPsec header type and IP checksum when applicable (e.g., for IPv4) as it changes due to the presence of IPsec fields. These operations also may include modifying other IP header fields such as IP length and checksum, as necessary.

As represented by block 1922, after these operations are performed, the security processor 1812 sends the resulting packets to the Ethernet network 1816. FIG. 20 depicts one embodiment of an IPsec packet 2014 that may be generated by the security processor 1812.

Complementary operations may be performed on inbound IPsec packets. For example, the security processor 1812 and the Ethernet controller 1810 may perform inbound packet operations similar to those discussed above.

Figure 21:
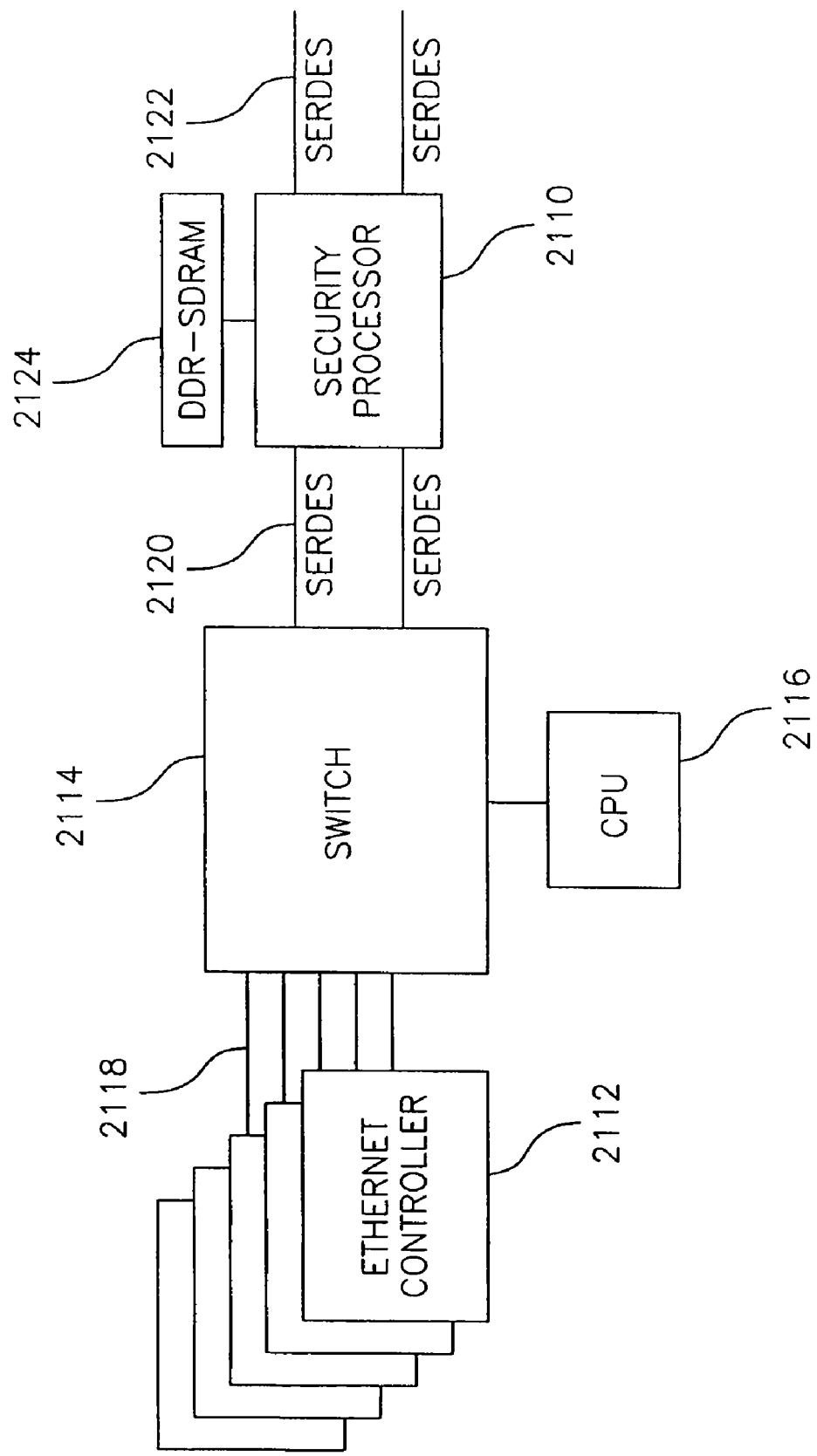
FIG. 21 is a block diagram of one embodiment of a security processing system constructed in accordance with the invention.

FIG. 21 depicts an embodiment of a system constructed according to the invention where one or more security processors 2110 provide services to one or more Ethernet controllers (or other networking devices) 2112. In this embodiment, the security processor 2110 is connected using switch 2114 as a backplane or fabric. The interconnection of other devices such as host processors, network processors or external ports is possible in this configuration. Outbound packet flow is from the Ethernet controllers 2112 over networks 2121 through the switch 2114, to the security processor 2110 via network 2120 and out to the network 2122. Inbound traffic flow is in the opposite direction. Thus, the switch 2114 distributes or collects packets between Ethernet controllers (or MACs) and the security processor.

The security processor 2110 is managed over the switch fabric by one or more host processors (e.g., CPU 2116). For example, the host processors 2116 may configure the security processor 2110 when the security processor is reset. In addition, the host processors 2116 may allocate the address space in the security processor 2110 to each of the Ethernet controller 2112 as each Ethernet controller 2112 comes on line. This address space may be used to store the security association information for sessions associated with each Ethernet controller. In this case, the Ethernet controllers 2112 may be configured to request access to the security processor 2110 from the host processors 2116.

In one embodiment, the switch 2114 adds a virtual LAN ("VLAN") tag to the packets received over networks 2118 from the Ethernet controllers 2112. In this way, the security processor 2110 may determine as to which Ethernet controller 2112 a given packet is associated.

From the above, it should be appreciated that by providing packet network connectivity in the security processors, communications with the security processors may be achieved through network fabric such as a switch. Moreover, this may be accomplished using the same connectivity and procedures that may be used for directly connected devices (e.g., a SNIC implementation).

In one embodiment, the switching system described herein is implemented as a chassis-based switch. For example, the chassis-based switch may include a backplane into which several blades (e.g., circuit cards) are plugged for interconnectivity. The switch/switching fabric is implemented as a switch blade in the chassis-based switch. An Ethernet controller and/or MAC may be incorporated into a processing blade in the chassis-based switch. A security processor may be incorporated into a switching blade in the chassis-based switch.

Figure 22:
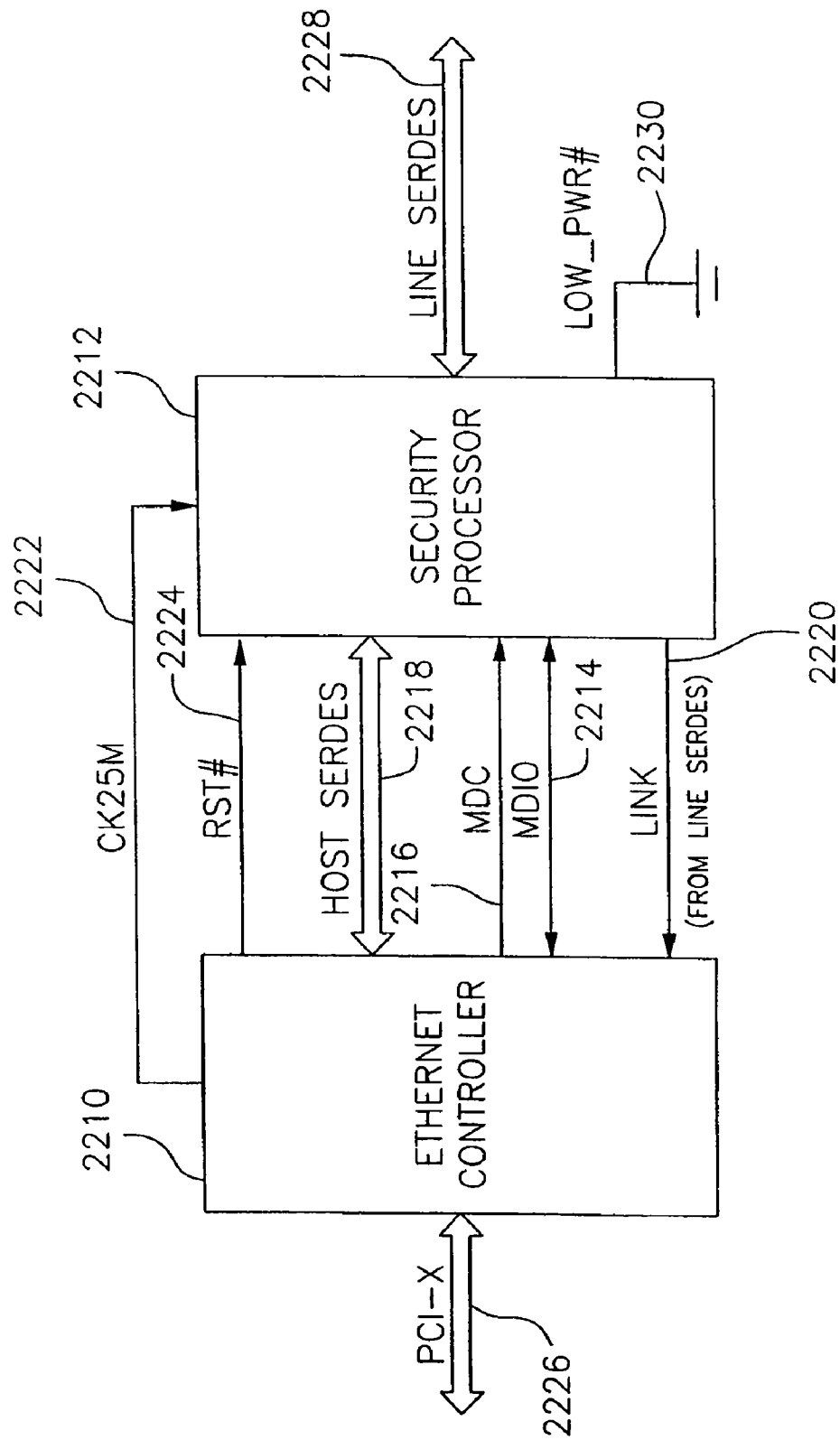
FIG. 22 is a block diagram of one embodiment of a security processing system constructed in accordance with the invention.

FIG. 22 illustrates one embodiment of interconnections between a security processor 2212 and an Ethernet controller on a SNIC. The Ethernet controller 2210 drives a reference clock 2222 and a system reset signal 2224. An MDC/MDIO interface 2216, 2214 may be used to configure the SERDES interface ports 2218 and 2228 on the security processor 2212. This interface may also be used to issue a reset (via register reset) and control the power state of the security processor 2212. The control provided by the MDC/MDIO interface may be used to configure the security processor during WakeOnLan mode. The security processor 2212 provides the link status of the line side SERDES 2228 to the host via a side band link 2220. When the LOW_PWR# input pin 2230 is tied to zero the security processor 2212 exits reset in a low power state.

Figure 23:
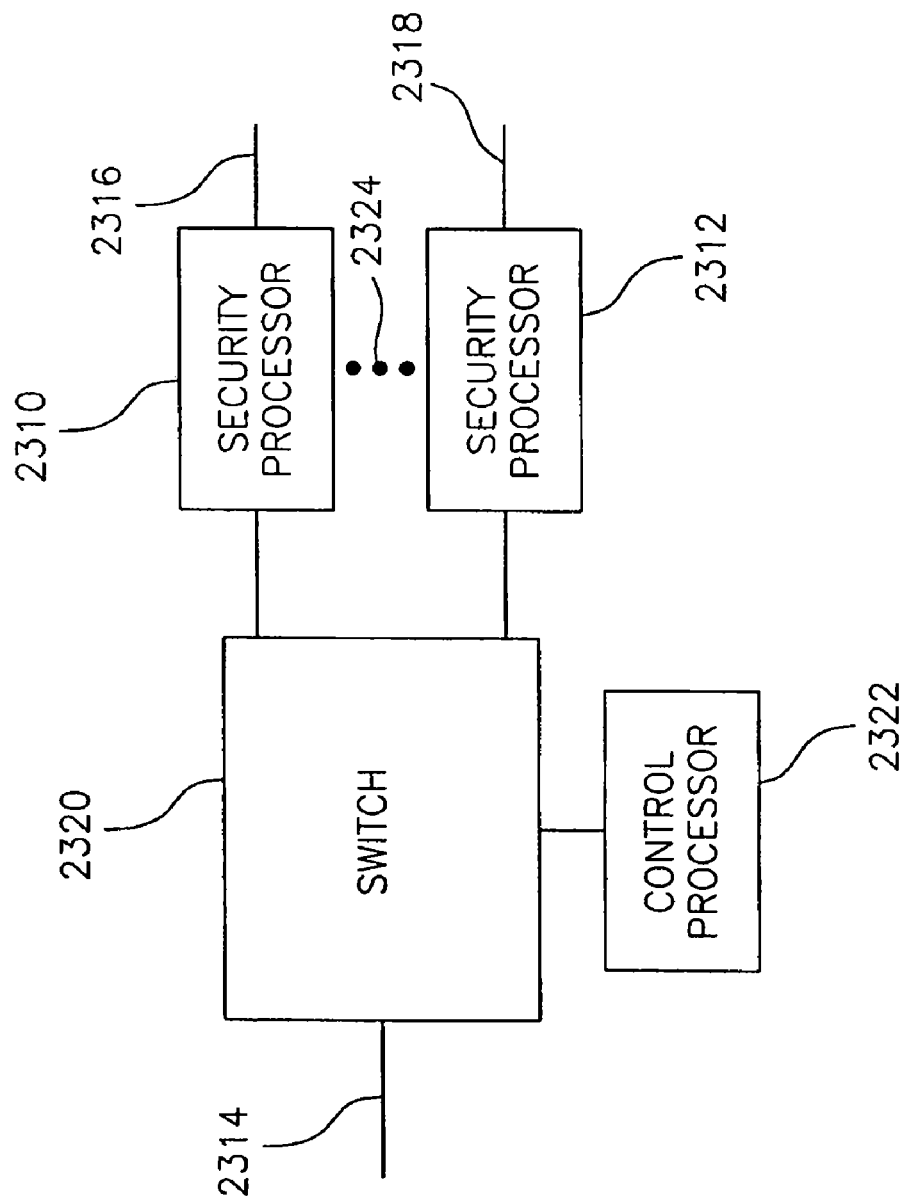
FIG. 23 is a block diagram of one embodiment of a security processing system constructed in accordance with the invention.

FIG. 23 depicts an embodiment of a system constructed according to the invention where several security processors 2310, 2312 provide services to networking devices (not shown) via switch 2320. As represented by the ellipse 2324, two or more security processors may be configured to provide security processing. The security processors 2310, 2312 are managed over the switch fabric by one or more control processors 2322. In one embodiment a 10 Gbit Ethernet controller connects to the system via Ethernet network 2314. The switch 2320 distributes and collects the traffic to/from the security processors 2310, 2312, etc. to provide IPsec processing at 10 Gbits over a packet network 2316, 2318, etc.

It should be appreciated that the inventions described herein are applicable to and may utilize many different protocols and standards and modifications and extensions of those protocols and standards including, for example and without limitation, IP, TCP, UDP, ICMP, IPsec, SSL and FCsec. Moreover, a variety of cryptographic and signature algorithms and modifications and extensions thereof may be used. The invention may be practiced using tunnel mode and/or transport mode packet processing.

In addition, a system constructed according to the invention may be implemented on a variety of data networks including, without limitation, fiber channel, Ethernet, ATM and FDDI. Thus, the interfaces discussed herein such as the MAC and PHY would support the corresponding data network.

It should also be appreciated that the inventions described herein may be constructed using a variety of physical components and configurations. For example, a variety of hardware and software processing components may be used to implement the functions of the host processors, security processors, network processors, Ethernet processors/controllers and other components.

These processing components may be implemented, without limitation, in a processor, a state machine or other hardware, or any combination of these and may involve execution of software, firmware or other code. These components may be combined on one or more integrated circuits. For example, several of these components may be combined within a single integrated circuit. Some components may be implemented as a single integrated circuit. Some components may be implemented using several integrated circuits.

The components and operations discussed herein may be applicable to various other embodiments. For example, the components and operations described with respect to one of the described embodiments may be substituted or incorporated into other embodiments.

In addition, the components and functions described herein may be connected/coupled in many different ways. The manner in which this is done may depend, in part, on whether and how the components are separated from the other components. Some of the connections represented by the lead lines in the drawings may be in an integrated circuit, on a circuit board, or over a backplane to other circuit boards. In some embodiments, the lead lines may represent a data network such as a local network and/or a wide area network (e.g., the Internet). Thus, some of the components may be located in a remote location with respect to the other components. In addition, these connections/couplings may be made with physical wire, fiber and/or wireless connections, for example.

Moreover, the signals discussed herein may take several forms. For example, in some embodiments a signal may be an electrical signal transmitted over a wire. Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

A wide variety of devices may be used to implement the data memories discussed herein. For example, a data memory may comprise one or more RAM, disk drive, SDRAM, FLASH or other types of data storage devices.

The invention may be practiced using different types of cipher engines. For example, in one embodiment of the invention data is decrypted using a block cipher or a stream cipher.

In summary, the invention described herein teaches improved security processing techniques. While certain exemplary embodiments have been described in detail and shown in the accompanying drawings, it is to be understood that such embodiments are merely illustrative of and not restrictive of the broad invention. In particular, is should be recognized that the teachings of the invention apply to a wide variety of systems and processes that are configurable. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A security processing method comprising:
   receiving, at a host-side interface of a security processor, an in-band packet from a device, wherein the in-band packet includes an internal security header encapsulating an original packet;
   cryptographically processing, at the security processor, at least a portion of the received original packet in the in-band packet using data from the internal security header;
   generating, at the secure processor, an outbound packet including the cryptographically processed portion of the original packet; and
   transmitting, via a line-side interface of the security processor, the outbound packet to a data communications network.

2. The security processing method of claim 1, wherein the outbound packet includes an outbound security header and an outbound security trailer.

3. The security processing method of claim 2, wherein the outbound security header is an IPsec header and the outbound security trailer is an IPsec trailer.

4. The security processing method of claim 3, wherein a size of a data payload of the original packet is modified by the first device to account for a size of the IPsec header and a size of the IPsec trailer in the outbound packet.

5. The security processing method of claim 2, wherein the in-band packet includes a placeholder for the outbound security header and a placeholder for the outbound security trailer.

6. The security processing method of claim 1, wherein the internal security header includes an index to a security association.

7. The security processing method of claim 6, wherein the index is a flow identifier.

8. The security processing method of claim 6, wherein processing, at the security processor, further comprises:
   retrieving the security association using the index; and
   cryptographically processing the at least a portion of the received outbound packet using the security association.

9. The security processing method of claim 1, further comprising:
   receiving, at the host-side interface of the security processor, a second in-band packet from a second device, wherein the second packet includes a second internal security header encapsulating a second original packet;
   processing, at the security processor, at least a portion of the received second original packet in the second in-band packet using data from the second internal security header;

generating, at the security processor, a second outbound packet including the cryptographically processed portion of the second outbound packet; and transmitting, via the line-side interface of the security processor, the second outbound packet to the data communications network.

10. The security processing method of claim 1, wherein the original packet is a TCP/IP packet.

11. The security processing method of claim 1, further comprising:

receiving, at the line-side interface of the security processor, a inbound packet from the data communications network, wherein the inbound packet includes a security header;

stripping the security header;

processing, at the security processor, at least a portion of the received packet according to data in the security header;

assembling a second in-band packet, wherein the second in-band packet includes a header and a data payload; and transmitting the in-band packet via the host-side interface of the security processor to the first device.

12. The security processing method of claim 11, further comprising:

determining whether the received inbound packet is part of a flow assigned to the security processor; and processing at least a portion of the received packet according to data in the security header if the received inbound packet is part of a flow assigned to the security processor.

13. The security processing method of claim 1, wherein the security processor and the device are in a trusted network.

14. A security processor comprising:

a first controller configured to receive at a host-side interface of the security processor an in-band packet from a device, wherein the in-band packet includes an internal security header encapsulating an original packet;

a cryptographic processor configured to cryptographically process at least a portion of the received original packet in the in-band packet using data from the internal security header; and a second controller configured to generate an outbound packet including the cryptographically processed portion of the original packet and transmit via a line-side interface of the security processor, the outbound packet to a data communications network.

15. The security processor of claim 14, wherein the internal security header includes an index to a security association.

16. The security processor of claim 15, wherein the index is a flow identifier.

17. The security processor of claim 15, further comprising:

a header processor configured to retrieve security association information using the index.

18. The security processor of claim 17, wherein the header processor is further configured to determine whether the header includes an address of the security processor and to retrieve security association information associated with the in-band packet if the address of the security processor is included in the in-band packet.

19. The security processor of claim 14, wherein the original packet is a TCP/IP packet.

* * * * *